(12) United States Patent
Xue et al.

(10) Patent No.: US 11,812,460 B2
(45) Date of Patent: Nov. 7, 2023

(54) SIDELINK BASED INTERFERENCE MANAGEMENT

(71) Applicant: QUALCOMM Incorporated, San Diego, CA (US)

(72) Inventors: Yisheng Xue, San Diego, CA (US); Xiaoxia Zhang, San Diego, CA (US); Jing Sun, San Diego, CA (US); Chih-Hao Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 17/506,513

(22) Filed: Oct. 20, 2021

(65) Prior Publication Data

US 2023/0117707 A1    Apr. 20, 2023

(51) Int. Cl.
*H04W 72/23* (2023.01)
*H04W 72/542* (2023.01)
*H04W 72/1263* (2023.01)
*H04L 5/00* (2006.01)
*H04W 24/10* (2009.01)

(52) U.S. Cl.
CPC ......... *H04W 72/542* (2023.01); *H04L 5/0053* (2013.01); *H04W 24/10* (2013.01); *H04W 72/1263* (2013.01); *H04W 72/23* (2023.01)

(58) Field of Classification Search
CPC ... H04W 72/542; H04W 72/23; H04W 24/10; H04W 72/1263; H04L 5/0053
USPC .......................................................... 370/329
See application file for complete search history.

(56) References Cited

U.S. PATENT DOCUMENTS

| 2017/0353971 A1* | 12/2017 | Gupta | .................... H04W 74/04 |
| 2018/0035448 A1* | 2/2018 | Gupta | .................... H04W 72/23 |

FOREIGN PATENT DOCUMENTS

| WO | WO 2018/022518 | * | 2/2018 | ............ H04W 76/02 |

* cited by examiner

*Primary Examiner* — Christopher R Crompton
(74) *Attorney, Agent, or Firm* — Holland & Hart LLP

(57) ABSTRACT

Methods, systems, and devices for wireless communications are described. Aspects of the disclosure describe using sidelink resources to identify possible interference (e.g., including cross-link interference) in a first resources used for communications between a base station and a user equipment (UE). With such techniques, a base station may transmit a conditional grant to a UE that schedules resources for the UE to use to communicate with the base station (e.g., either uplink or downlink). The UE may monitor sidelink resources to identify an indication of interference for the resources scheduled by the conditional grant. Different UEs may exchange messages or may transmit energy over the sidelink network to indicate resources are being used to communicate between base stations and UEs. The UE may transmit an acknowledgement or a negative acknowledgement to the base station indicating whether the resources scheduled by the conditional grant are to be used by the UE.

30 Claims, 17 Drawing Sheets

SIDELINK BASED INTERFERENCE MANAGEMENT

FIELD OF TECHNOLOGY

The following relates to wireless communications, including sidelink based interference management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sidelink based interference management. Generally, the described techniques provide for using sidelink resources to identify possible interference (e.g., including cross-link interference (CLI)) in a first resource used for communications between a base station and a user equipment (UE) (e.g., a Uu link communication). In such techniques, a base station may transmit a conditional grant to a UE that schedules resources for the UE to use to communicate with the base station (e.g., either uplink or downlink). The UE may monitor sidelink resources to identify an indication of interference for the resources scheduled by the conditional grant. Different UEs may exchange messages or may transmit energy over the sidelink network to indicate resources are being used to communicate between base stations and UEs. The UE may transmit an acknowledgement or a negative acknowledgement to base station indicating whether the resources scheduled by the conditional grant are to be used by the UE.

A method for wireless communication at a UE is described. The method may include receiving, from a base station, a conditional grant that schedules a first resource for communications between the UE and the base station, the conditional grant including a first indication to use a sidelink resource to identify a likelihood of interference between different base stations communicating using the first resource, monitoring the sidelink resource for a second indication of interference associated with the first resource based on receiving the conditional grant, and transmitting, to the base station using a second resource, a third indication of whether the interference associated with the first resource of the conditional grant satisfies one or more criteria based on monitoring the sidelink resource.

An apparatus for wireless communication at a UE is described. The apparatus may include a processor, memory coupled with the processor, and instructions stored in the memory. The instructions may be executable by the processor to cause the apparatus to receive, from a base station, a conditional grant that schedules a first resource for communications between the UE and the base station, the conditional grant including a first indication to use a sidelink resource to identify a likelihood of interference between different base stations communicating using the first resource, monitor the sidelink resource for a second indication of interference associated with the first resource based on receiving the conditional grant, and transmit, to the base station using a second resource, a third indication of whether the interference associated with the first resource of the conditional grant satisfies one or more criteria based on monitoring the sidelink resource.

Another apparatus for wireless communication at a UE is described. The apparatus may include means for receiving, from a base station, a conditional grant that schedules a first resource for communications between the UE and the base station, the conditional grant including a first indication to use a sidelink resource to identify a likelihood of interference between different base stations communicating using the first resource, means for monitoring the sidelink resource for a second indication of interference associated with the first resource based on receiving the conditional grant, and means for transmitting, to the base station using a second resource, a third indication of whether the interference associated with the first resource of the conditional grant satisfies one or more criteria based on monitoring the sidelink resource.

A non-transitory computer-readable medium storing code for wireless communication at a UE is described. The code may include instructions executable by a processor to receive, from a base station, a conditional grant that schedules a first resource for communications between the UE and the base station, the conditional grant including a first indication to use a sidelink resource to identify a likelihood of interference between different base stations communicating using the first resource, monitor the sidelink resource for a second indication of interference associated with the first resource based on receiving the conditional grant, and transmit, to the base station using a second resource, a third indication of whether the interference associated with the first resource of the conditional grant satisfies one or more criteria based on monitoring the sidelink resource.

Some examples of the method, apparatuses, and non-transitory computer-readable medium described herein may further include operations, features, means, or instructions for receiving, as part of the conditional grant, a fourth indication of the sidelink resource used to identify the likelihood of interference associated with the first resource, where monitoring the sidelink resource may be based on receiving the fourth indication of the sidelink resource.

Some examples of the method, apparatuses, and non-transitory computer-readable medium described herein may further include operations, features, means, or instructions for identifying the sidelink resource based on a mapping between the first resource and one or more sidelink resources, where monitoring the sidelink resource may be based on identifying the sidelink resource.

Some examples of the method, apparatuses, and non-transitory computer-readable medium described herein may further include operations, features, means, or instructions for transmitting, over the sidelink resource, a sidelink message to reserve the first resource for communication with the base station, where transmitting the third indication to the base station may be based on transmitting the sidelink message.

In some examples of the method, apparatuses, and non-transitory computer-readable medium described herein, the sidelink message includes a fourth indication of the first resource.

In some examples of the method, apparatuses, and non-transitory computer-readable medium described herein, the sidelink message may be included in sidelink control information, a medium access control control element in broadcast physical sidelink shared channel, groupcast physical sidelink shared channel, or a combination thereof.

In some examples of the method, apparatuses, and non-transitory computer-readable medium described herein, the sidelink message includes a flag that the first resource may be reserved for uplink communications or downlink communications.

In some examples of the method, apparatuses, and non-transitory computer-readable medium described herein, the sidelink message includes a physical cell identifier of the base station or a compressed indicator of the base station.

In some examples of the method, apparatuses, and non-transitory computer-readable medium described herein, the sidelink message indicates a value of a threshold to compare with the interference associated with the first resource and the method, apparatuses, and non-transitory computer-readable medium may include further operations, features, means, or instructions for determining whether the interference satisfies the threshold, where transmitting the third indication may be based on the determination.

In some examples of the method, apparatuses, and non-transitory computer-readable medium described herein, the sidelink message further indicates a difference between a transmit power associated with the first resource and a transmit power associated with the sidelink resource.

Some examples of the method, apparatuses, and non-transitory computer-readable medium described herein may further include operations, features, means, or instructions for receiving, as part of the conditional grant, a fourth indication of the second resource used to transmit the third indication, where transmitting the third indication to the base station over the second resource may be based on receiving the fourth indication of the second resource.

In some examples of the method, apparatuses, and non-transitory computer-readable medium described herein, monitoring the sidelink resource may include operations, features, means, or instructions for monitoring a signal strength received over the sidelink resource, where transmitting the third indication may be based on monitoring the signal strength.

Some examples of the method, apparatuses, and non-transitory computer-readable medium described herein may further include operations, features, means, or instructions for monitoring the signal strength may be part of a contention-based channel access protocol associated with the sidelink resource.

Some examples of the method, apparatuses, and non-transitory computer-readable medium described herein may further include operations, features, means, or instructions for communicating, with the base station, over the first resource based on the interference associated with the first resource of the conditional grant being below a threshold.

In some examples of the method, apparatuses, and non-transitory computer-readable medium described herein, the third indication includes an acknowledgement that the UE may be using the first resource for communications scheduled by the conditional grant.

Some examples of the method, apparatuses, and non-transitory computer-readable medium described herein may further include operations, features, means, or instructions for refraining from communicating with the base station over the first resource based on the interference associated with the first resource of the conditional grant being above a threshold.

In some examples of the method, apparatuses, and non-transitory computer-readable medium described herein, the third indication includes a negative acknowledgement that the UE may be failing to use the first resource for communications scheduled by the conditional grant.

In some examples of the method, apparatuses, and non-transitory computer-readable medium described herein, the first resource includes a downlink communication between the base station and the UE and the method, apparatuses, and non-transitory computer-readable medium may include further operations, features, means, or instructions for determining that an uplink communication between a second base station and a second UE may be scheduled to use the first resource, where refraining from communicating may be based on the determination.

In some examples of the method, apparatuses, and non-transitory computer-readable medium described herein, the first resource includes a downlink communication between the base station and the UE and the method, apparatuses, and non-transitory computer-readable medium may include further operations, features, means, or instructions for determining that the interference between the first resource used for communications between the base station and the UE may be caused by an uplink communication between a second base station and a second UE, the second base station being associated with the base station, where refraining from communicating may be based on the determination.

In some examples of the method, apparatuses, and non-transitory computer-readable medium described herein, the first resource includes a downlink communication between the base station and the UE and the method, apparatuses, and non-transitory computer-readable medium may include further operations, features, means, or instructions for determining that the interference between the first resource used for communications between the base station and the UE may be caused by an uplink communication between a second base station and a second UE and that the interference may be above the threshold, where refraining from communicating may be based on the determination.

In some examples of the method, apparatuses, and non-transitory computer-readable medium described herein, the likelihood of interference may be determined based on a quantity of resource elements of the first resource experiencing the interference with a link between a second base station and a second UE, a set of sidelink demodulation reference signals satisfying one or more thresholds, or both.

In some examples of the method, apparatuses, and non-transitory computer-readable medium described herein, the first resource includes a first downlink communication between the base station and the UE and the method, apparatuses, and non-transitory computer-readable medium may include further operations, features, means, or instructions for determining that a second downlink communication between a second base station and a second UE may be scheduled to use the first resource, where refraining from communicating may be based on the determination.

In some examples of the method, apparatuses, and non-transitory computer-readable medium described herein, the first resource includes a first downlink communication between the base station and the UE and the method, apparatuses, and non-transitory computer-readable medium may include further operations, features, means, or instructions for determining that the interference between the first resource used for communications between the base station and the UE may be caused by a second downlink communication between a second base station and a second UE, the second base station being associated with the base station, where refraining from communicating may be based on the determination.

In some examples of the method, apparatuses, and non-transitory computer-readable medium described herein, the first resource includes a first downlink communication between the base station and the UE and the method, apparatuses, and non-transitory computer-readable medium may include further operations, features, means, or instructions for determining that the interference between the first resource used for communications between the base station and the UE may be caused by a second downlink communication between a second base station and a second UE and determining that the interference includes CLI with an uplink communication, where refraining from communicating may be based on the determinations.

In some examples of the method, apparatuses, and non-transitory computer-readable medium described herein, the first resource includes an uplink communication between the base station and the UE and the method, apparatuses, and non-transitory computer-readable medium may include further operations, features, means, or instructions for determining that a downlink communication between a second base station and a second UE may be scheduled to use the first resource, where refraining from communicating may be based on the determination.

In some examples of the method, apparatuses, and non-transitory computer-readable medium described herein, the first resource includes an uplink communication between the base station and the UE and the method, apparatuses, and non-transitory computer-readable medium may include further operations, features, means, or instructions for determining that the interference between the first resource used for communications between the base station and the UE may be caused by a downlink communication between a second base station and a second UE and that the interference being above the threshold, where refraining from communicating may be based on the determination.

In some examples of the method, apparatuses, and non-transitory computer-readable medium described herein, the first resource includes a first uplink communication between the base station and the UE and the method, apparatuses, and non-transitory computer-readable medium may include further operations, features, means, or instructions for determining that a second uplink communication between a second base station and a second UE may be scheduled to use the first resource, where refraining from communicating may be based on the determination.

In some examples of the method, apparatuses, and non-transitory computer-readable medium described herein, the first resource includes a first uplink communication between the base station and the UE and the method, apparatuses, and non-transitory computer-readable medium may include further operations, features, means, or instructions for determining that the interference between the first resource used for communications between the base station and the UE may be caused by a second uplink communication between a second base station and a second UE, the second base station being associated with the base station, where refraining from communicating may be based on the determination.

In some examples of the method, apparatuses, and non-transitory computer-readable medium described herein, the first resource includes a first uplink communication between the base station and the UE and the method, apparatuses, and non-transitory computer-readable medium may include further operations, features, means, or instructions for determining that the interference between the first resource used for communications between the base station and the UE may be caused by a second uplink communication between a second base station and a second UE and determining that the interference includes CLI with an uplink communication, where refraining from communicating may be based on the determinations.

In some examples of the method, apparatuses, and non-transitory computer-readable medium described herein, the interference includes CLI between base stations transmitting and receiving over a same frequency resource in a time division duplexing scheme, the CLI corresponding to uplink-to-downlink interference.

In some examples of the method, apparatuses, and non-transitory computer-readable medium described herein, the conditional grant includes a sidelink gated downlink and uplink grant.

In some examples of the method, apparatuses, and non-transitory computer-readable medium described herein, the third indication includes information identified in response to monitoring the sidelink resource and the third indication may be transmitted as part of uplink control information.

In some examples of the method, apparatuses, and non-transitory computer-readable medium described herein, the third indication includes a physical uplink shared channel transmission.

A method for wireless communications at a base station is described. The method may include transmitting, to a UE, a conditional grant that schedules a first resource for communications between the UE and the base station, the conditional grant including a first indication to use a sidelink resource to identify a likelihood of interference between different base stations communicating using the first resource and receiving, from the UE using a second resource, a second indication of whether the interference associated with the first resource of the conditional grant satisfies one or more criteria based on transmitting the conditional grant.

An apparatus for wireless communications at a base station is described. The apparatus may include a processor, memory coupled with the processor, and instructions stored in the memory. The instructions may be executable by the processor to cause the apparatus to transmit, to a UE, a conditional grant that schedules a first resource for communications between the UE and the base station, the conditional grant including a first indication to use a sidelink resource to identify a likelihood of interference between different base stations communicating using the first resource and receive, from the UE using a second resource, a second indication of whether the interference associated with the first resource of the conditional grant satisfies one or more criteria based on transmitting the conditional grant.

Another apparatus for wireless communications at a base station is described. The apparatus may include means for transmitting, to a UE, a conditional grant that schedules a first resource for communications between the UE and the base station, the conditional grant including a first indication to use a sidelink resource to identify a likelihood of interference between different base stations communicating using the first resource and means for receiving, from the UE using a second resource, a second indication of whether the interference associated with the first resource of the conditional grant satisfies one or more criteria based on transmitting the conditional grant.

A non-transitory computer-readable medium storing code for wireless communications at a base station is described. The code may include instructions executable by a processor to transmit, to a UE, a conditional grant that schedules a first resource for communications between the UE and the base station, the conditional grant including a first indication to use a sidelink resource to identify a likelihood of interference between different base stations communicating using the first resource and receive, from the UE using a second resource, a second indication of whether the interference associated with the first resource of the conditional grant satisfies one or more criteria based on transmitting the conditional grant.

Some examples of the method, apparatuses, and non-transitory computer-readable medium described herein may further include operations, features, means, or instructions for transmitting, as part of the conditional grant, a fourth indication of the sidelink resource used to identify the likelihood of interference associated with the first resource.

Some examples of the method, apparatuses, and non-transitory computer-readable medium described herein may further include operations, features, means, or instructions for communicating with a second base station to identify sidelink resources used to identify the likelihood of interference between different base stations and identifying one or more sidelink resources for use by UEs associated with the base station to transmit sidelink messages, where transmitting the first indication may be based on the identifying.

Some examples of the method, apparatuses, and non-transitory computer-readable medium described herein may further include operations, features, means, or instructions for transmitting, to the UE, a downlink message based on receiving the second indication, where the downlink message may be scheduled by the conditional grant and includes downlink control information.

Some examples of the method, apparatuses, and non-transitory computer-readable medium described herein may further include operations, features, means, or instructions for transmitting, as part of the conditional grant, a fourth indication of the second resource used to receive the second indication, where receiving the second indication from the UE over the second resource may be based on transmitting the fourth indication of the second resource.

Some examples of the method, apparatuses, and non-transitory computer-readable medium described herein may further include operations, features, means, or instructions for communicating, with the UE, over the first resource based on the interference associated with the first resource of the conditional grant being below a threshold.

In some examples of the method, apparatuses, and non-transitory computer-readable medium described herein, the second indication includes an acknowledgement that the UE may be using the first resource for communications scheduled by the conditional grant.

Some examples of the method, apparatuses, and non-transitory computer-readable medium described herein may further include operations, features, means, or instructions for refraining from communicating with the UE over the first resource based on the interference associated with the first resource of the conditional grant being above a threshold.

In some examples of the method, apparatuses, and non-transitory computer-readable medium described herein, the second indication includes a negative acknowledgement that the UE may be failing to use the first resource for communications scheduled by the conditional grant.

In some examples of the method, apparatuses, and non-transitory computer-readable medium described herein, the interference includes CLI between base stations transmitting and receiving over a same frequency resource in a time division duplexing scheme, the CLI corresponding to uplink-to-downlink interference.

In some examples of the method, apparatuses, and non-transitory computer-readable medium described herein, the conditional grant includes a sidelink gated downlink and uplink grant.

In some examples of the method, apparatuses, and non-transitory computer-readable medium described herein, the second indication may be received as part of uplink control information.

In some examples of the method, apparatuses, and non-transitory computer-readable medium described herein, the second indication includes a physical uplink shared channel transmission.

DETAILED DESCRIPTION

Wireless communications system may utilize larger bandwidths of frequency resources in higher frequency spectrum bands to achieve higher data rates and lower latency (e.g., FR2). Frequency division duplexing (FDD) arrangements in the higher frequency spectrum bands may lead to limited coverage for uplink communications and may fail to provide satisfactory performance for uplink-centric use cases. To address these issues, time division duplexing (TDD) arrangements may be used in the higher frequency spectrum bands. In the TDD arrangements resources may be allocated for use for uplink communications or downlink communications between a base station and a UE. TDD arrangements may experience cross-link interference, where the base stations interfere with each other as they transmit and receive in the same frequency band (e.g., interference caused by both uplink communications and downlink communications in the same frequency resources).

Aspects of the present disclosure describe using sidelink resources to identify possible interference (e.g., including cross-link interference (CLI)) in a first resources used for communications between a base station and a UE (e.g., a Uu link communication). In such techniques, a base station may transmit a conditional grant to a UE that schedules resources for the UE to use to communicate with the base station (e.g., either uplink or downlink). The UE may then monitor sidelink resources to identify an indication of interference for the resources scheduled by the conditional grant. Different UEs may exchange messages or may transmit energy over the sidelink network to indicate resources are being used to communicate between base stations and UEs. The UE may transmit an acknowledgement or a negative acknowledgement to base station indicating whether the resources scheduled by the conditional grant are to be used by the UE.

Aspects of the disclosure are initially described in the context of wireless communications systems. Aspects of the disclosure are further illustrated by and described with reference to a CLI diagram, resource diagrams, and a process flow. Aspects of the disclosure are further illustrated by and described with reference to apparatus diagrams, system diagrams, and flowcharts that relate to sidelink based interference management.

Figure 1:
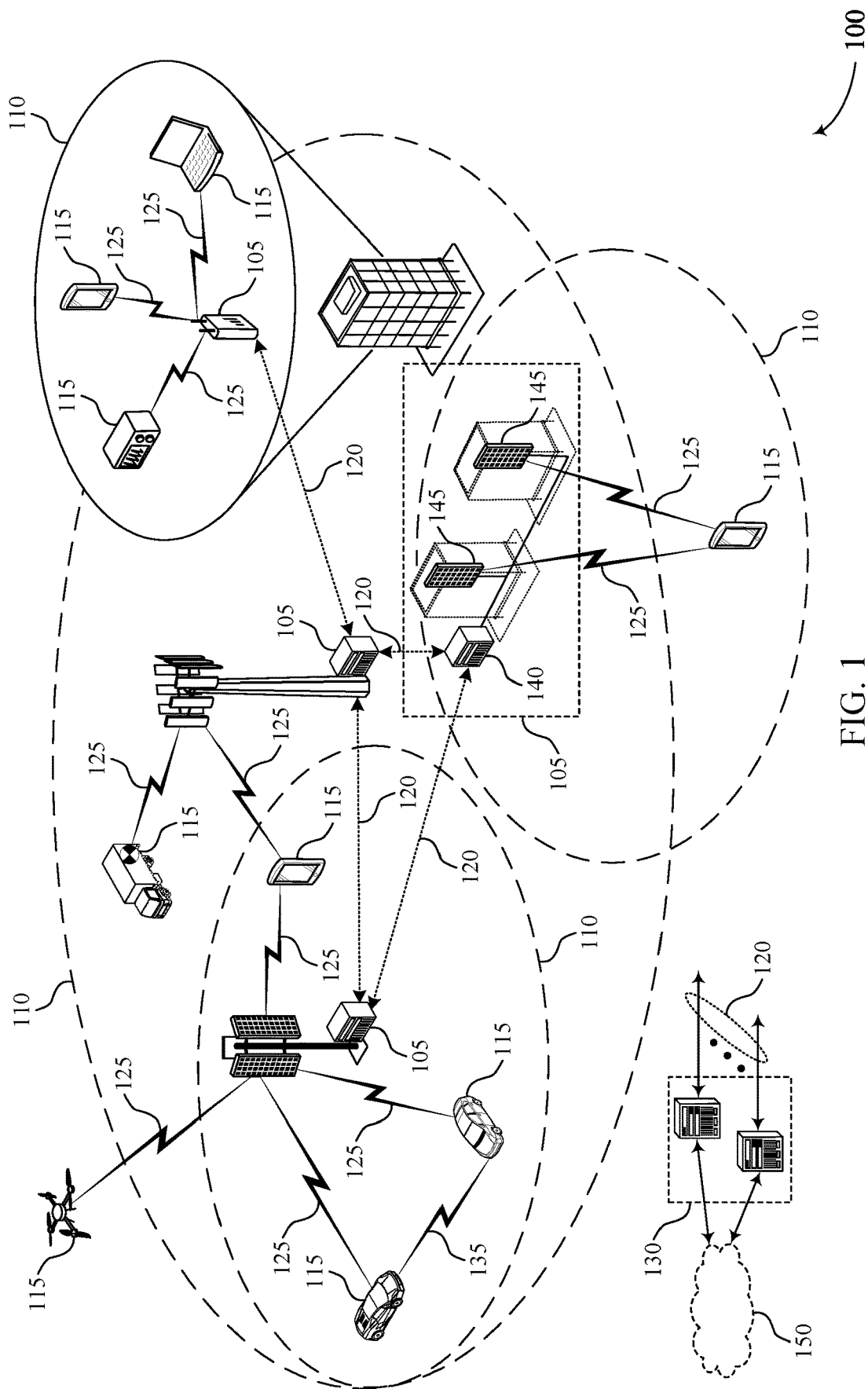
FIG. 1 illustrates an example of a wireless communications system that supports sidelink based interference management in accordance with aspects of the present disclosure.

FIG. 1 illustrates an example of a wireless communications system 100 that supports sidelink based interference management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both FDD and TDD component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless communications systems (e.g., in NR) may utilize relatively larger bandwidths within mid-range and high-range bands to achieve higher data rates and lower latency signaling (e.g., as compared to LTE). In some examples, NR may carry greater than 3 gigahertz (GHz) that may be implemented within a TDD band. Deployment of such bands may be synchronized to downlink and uplink throughout the deployment. In some cases, the deployment may correspond to a downlink centric set-up (e.g., inherited from LTE) to support one or more applications, such as video streaming applications. However, in some cases, the downlink centric set-up may lead to limited uplink coverage (e.g., when there is not enough time to accumulate energy in uplink). Additionally, downlink centric set-ups may not provide satisfactory performance for uplink centric use cases.

In some cases, flexible TDD may be utilized. For example, flexible TDD may allow the base station 105 to determine whether a given signal corresponds to uplink or downlink according to local traffic observed by the base station 105. In some cases, however, flexible TDD may lead to CLI. For example, a first UE 115 and a first base station 105 may suffer extra uplink to downlink and downlink to uplink interference from a second UE 115 and a second base station 105 as compared to a synchronized downlink and uplink configuration.

Some wireless communications systems may have features to focus on UE 115 to UE 115 CLI measurements. For example, L3 based measurements may be specified to enable a first UE 115 to measure interference from a second UE 115 (e.g., focused on uplink to downlink CLI). A CLI report is used to generate an intended downlink and uplink configuration. Based on the CLI report, neighboring base stations 105 may negotiate over backhaul to arrive at flexible TDD configurations. However, based on L3 measurements, it may not be possible to serve dynamic traffic that utilizes flexible TDD. Additionally, the framework may utilize overhead, which may be prohibitive to further communications. For example, cell-to-cell jamming may be feasible for coarse-granularity inter-base station 105 coordination. As such, deployments in practice may be challenging due to increased backhaul demands.

One way to boost uplink is to flexibly allocate more uplink slots when more slots would support use cases such as the aforementioned future use cases. However, CLI may not be sufficiently managed, which may result in degraded quality of signaling and use cases at a device.

One such way to overcome increased CLI is to utilize sidelink signaling to coordinate between base stations 105 and UEs 115. While sidelink focuses on D2D use cases (including V2X use cases), there exist two radio resource allocations modes that may support enhanced coordination between devices. For example, Mode 1 for in-coverage deployments where a sidelink transmitting (Tx) UE 115 receives a grant from a base station 105 for sidelink channel access. As another example, Mode 2 for autonomous deployment where a sidelink Tx UE 115 utilizes sensing (e.g., listen-before-talk (LBT)) for sidelink collision avoidance. In such cases, sidelink channel access may include a physical sidelink control channel (PSCCH) and a physical sidelink shared channel (PSSCH). PSCCH may carry stage one sidelink control information (SCI-1) which, after decoding an SCI-1, a receiving (Rx) UE 115 may decode a corresponding SCI-2 to determine whether the Rx UE 115 is the intended receiver of a corresponding transmission. If yes, the Rx UE 115 may proceed to decode PSSCH. For example, the Rx UE 115 may utilize sensing in a power saving mode, inter-UE coordination, and UE-to-network relaying for advanced V2X applications as well as adjacent use cases.

For example, when a resource selection is triggered, a physical layer (PHY) of a UE 115 may examine a sensing window to identify a set of candidate resources in a resource selection window. A sidelink resource may be examined to determine whether the resource is available (e.g., if the sidelink resource has not been reserved by any SCI-1 within the sensing window) whose demodulation reference signal (DMRS) is stronger than a priority-dependent threshold. A Mode 2 Tx UE 115 may continuously sense up to a certain symbol (e.g., T3) before the actual transmission to avoid further collisions, which may be referred to as re-evaluation.

In the case of Mode 1, a UE 115 may have buffered data and transmit a request (e.g., scheduling request (SR), buffer status report (BSR), or both) to a base station 105. The request may also be sent as assistance information for the UE 115 when requesting a configured sidelink grant. In such cases, the base station 105 may issue a grant via radio resource control (RRC) (e.g., in the case of a configured grant) or via downlink control information (DCI) (e.g., in the case of a dynamic grant). The grant may include up to three pieces of sidelink resources for the UE 115 to perform channel access procedures. For example, the UE 115 may access the granted resources and may request a hybrid automatic repeat request (HARQ) responses from the intended receiver (e.g., a second UE 115). The UE 115 may also provide a physical uplink control channel (PUCCH) acknowledgement/negative acknowledgement (ACK/NACK) resource to update a corresponding status to the base station 105. In some cases, the ACK/NACK resource may be utilized for requesting additional sidelink resources for retransmissions when no ACK is received over a physical sidelink feedback channel (PSFCH) from the second UE 115.

The described techniques relate to improved methods, systems, devices, and apparatuses that support sidelink based interference management. Generally, the described techniques provide for using sidelink resources to identify possible interference (e.g., including CLI) in a first resources used for communications between a base station 105 and a UE 115 (e.g., a Uu link communication). In such techniques, a base station 105 may transmit a conditional grant to a UE 115 that schedules resources for the UE 115 to use to communicate with the base station 105 (e.g., either uplink or downlink). The UE 115 may then monitor sidelink resources to identify an indication of interference for the resources scheduled by the conditional grant. Different UEs 115 may exchange messages or may transmit energy over the sidelink network to indicate resources are being used to communicate between base stations 105 and UEs 115. The UE 115 may transmit an acknowledgement or a negative acknowledgement to base station 105 indicating whether the resources scheduled by the conditional grant are to be used by the UE 115.

Figure 2A:
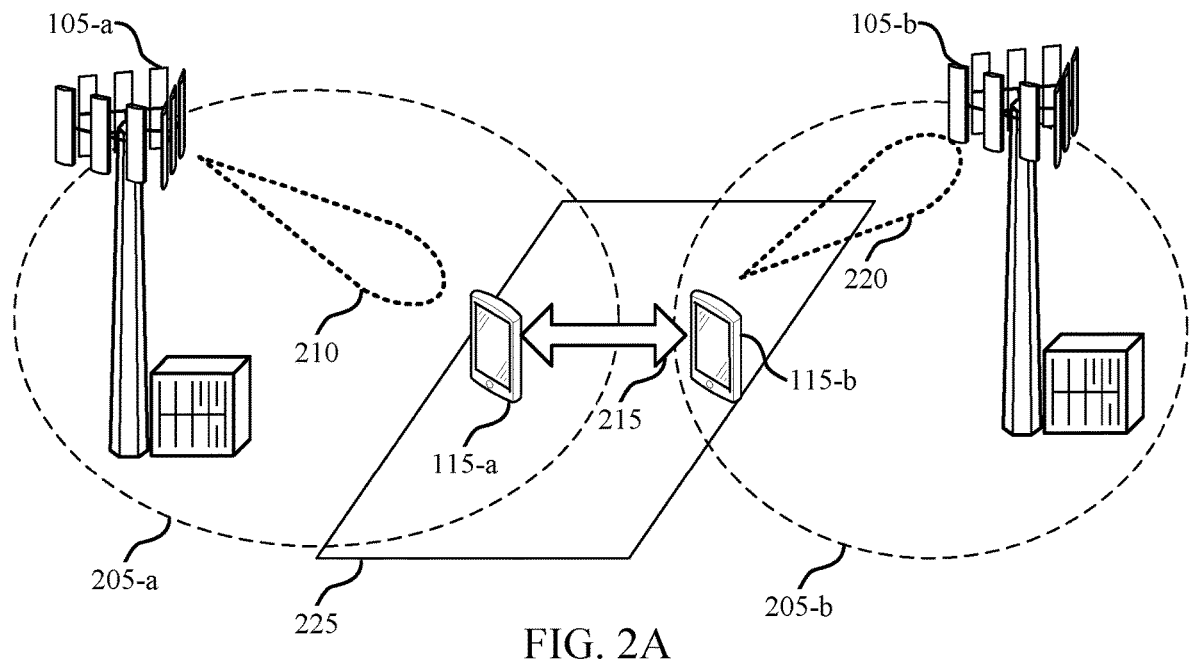
FIGS. 2A and 2B illustrate examples of a wireless communications system that supports sidelink based interference management in accordance with aspects of the present disclosure.

FIG. 2A illustrates an example of a wireless communications system 201 that supports sidelink based interference management in accordance with aspects of the present disclosure. The wireless communications system 200 may implement or be implemented by one or more aspects of the wireless communications system 100. For example, the wireless communications system 201 may include a UE **115-*a*, a UE 115-*b*, a base station 105-*a*, and a base station 105-*b*, which may be examples of the UE 115 and the base station 105 as described with reference to FIG. 1. The UE 115-*a* may reside within a geographic coverage area 205-*a* corresponding to the base station 105-*a*. Similarly, the UE 115-*b* may reside within a geographic coverage area 205-*b* corresponding to the base station 105-*b***.

The base station **105-*a* and the UE 115-*a* may communicate via a beamformed communication 210 (e.g., a downlink communication) while the base station 105-*b* and the UE 115-*b* may communicate via a beamformed communication 220 (e.g., an uplink communication). In cases where base station 105-*a* and the base station 105-*b* may be geographically proximate to each other, the base station 105-*a* may interfere with the base station 105-*b*. Interference in a TDD network could take different forms including interference between a first downlink communication and a second downlink communication that may use at least partially overlapping resources, interference between a first uplink communication and a second uplink communication that may use at least partially overlapping resources, and interference between a downlink communication and an uplink communication that may use at least partially overlapping resources (e.g., CLI). In some examples of CLI, downlink communications generated by the base station 105-*a* may be inadvertently received at the base station 105-*b*, which may interfere with uplink transmissions from the UE 115-*b*. In some examples, the UE 115-*a* may interfere with the UE 115-*b* via CLI (e.g., if uplink transmissions from the UE 115-*b* are erroneously received at the UE 115-*a*, which may interfere with downlink communications from the base station 105-*a***).

Aspects of the present disclosure provide for enabling sidelink communications (e.g., utilizing sidelink resource pools 225 and a sidelink channel 215) among a set of UEs (e.g., the UE **115-*a* and the UE 115-*b*) that may suffer relatively strong interference in a TDD configuration to utilize conditional grants (sometimes referred to as sidelink-gated uplink grants or sidelink-gated downlink grants) to mitigate a likelihood of interference. For example, after receiving a conditional grant (e.g., for either uplink or downlink), a UE (e.g., the UE 115-*a*, the UE 115-*b*) may perform a Mode 2 like evaluation with respect to the granted uplink or downlink resource in a configured Rx sidelink resource pool (e.g., sidelink resource pools 225) to identify whether there unacceptable interference (e.g., interference greater than a threshold). The UEs may transmit PSCCH, PSSCH, or both, carrying a reservation corresponding to the downlink or uplink resource to keep neighboring UEs 115 and base stations 105 abreast of potential sources of CLI. That is, with a common sidelink resource pool (e.g., sidelink resource pools 225) attached to multiple base stations 105 (e.g., the base station 105-*a*, the base station 105-*b*), features of sidelink may be utilized to build more capable CLI mitigation schemes to facilitate more dynamic and flexible division duplexing on Uu interfaces. Sensing and reservation (e.g., the most salient features in sidelink Mode 2**) with respect to a downlink or uplink resource using sidelink signaling and measurement may be configured to facilitate communications over Uu links. A conditional grant may be any grant of resources sent to the UE that UE may have the option to use or not use based on one or more conditions being satisfied. An example of a conditional grant may be a sidelink-gated grant where one or more sidelink resources may be used to identify a likelihood of interference over the resources granted by the sidelink-gated grant.

In cases where a likelihood of interference may lower than a threshold, the UE may transmit a sidelink message corresponding to the downlink resource or uplink resource included in the conditional grant. The sidelink message may be transmitted over resources in a Tx sidelink resource pool. The UE may also transmit an indication to the scheduling base station (e.g., a PUCCH ACK) to initiate downlink or uplink communications, or both that were scheduled using the conditional grant. Otherwise, the UE may transmit a NAK to invalidate SL gated downlink or uplink grants. By utilizing a dynamic (e.g., upon L1 signaling) design, potential conflicts or collisions between UEs (e.g., the UE **115-*a* and the UE 115-*b***) may be resolved according to UE-to-UE jamming that does not utilize backhaul links between base stations.

Figure 2B:
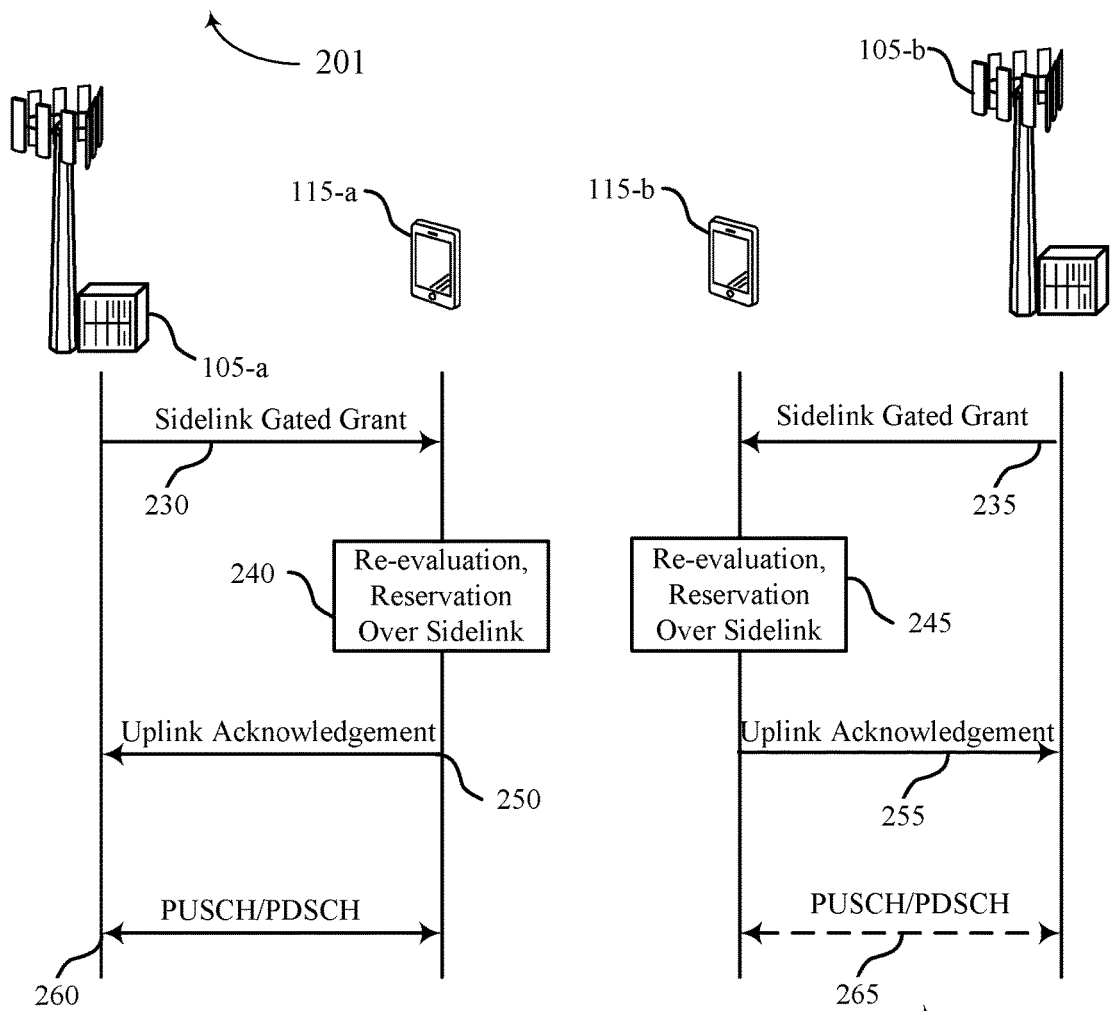

FIG. 2B illustrates a process flow corresponding to the wireless communications system 201, which supports sidelink-gated downlink resources or sidelink-gated uplink resources to avoid or mitigate interference occurrences. Put another way, the UE **115-*a*, which may be configured with an Rx sidelink resource pool and a Tx pool from the base station 105-*a*, may receive, from the base station 105-*a*, a conditional grant at 230 (e.g., a sidelink-gated grant for downlink or uplink resources) to facilitate flexible TDD communications that manages possibilities of interference between communications. Similarly, at 235, the UE 115-*b* may receive a conditional grant from the base station 105-*b***. The grant may include the downlink or uplink resource (e.g., a first resource), a sidelink resource, an additional PUCCH ACK/NACK resource (e.g., a second resource), or any combination thereof.

At 240, upon receiving the grant, the UE **115-*a* may perform Mode 2 like re-evaluation with respect to the granted downlink or uplink resource by parsing reservations received in the Rx sidelink resource pool (e.g., sidelink resource pools 225) by utilizing a sensing window for re-evaluation as described with reference to FIG. 1. Similarly, at 245, the UE 115-*b* may perform re-evaluation and reservation over sidelink resources. If the UE 115-*a* determines that transmissions from the UE 115-*a* are not affecting neighboring UEs (e.g., the UE 115-*a* is not an aggressor) and the UE 115-*a* is not experiencing interference or CLI from neighboring UEs (e.g., the UE 115-*a* is not a victim of interference or CLI), the UE 115-*a* may transmit PSCCH, PSSCH, or both, over the granted sidelink resource carrying a reservation corresponding to the conditional grant of downlink resources or uplink resources. Additionally or alternatively, at 250, the UE 115-*a* may transmit an indication (e.g., PUCCH ACK to the base station 105-*a*** to initiate transmission of physical downlink shared channel (PDSCH), physical uplink shared channel (PUSCH), or both at 260. Similarly, at 255, the UE 115-*b* may transmit a PUCCH ACK to the base station 105-*b* to initiate transmission of PUSCH, PDSCH, or both at 265. Otherwise, the UE 115-*a* may transmit an indication (e.g., PUCCH NAK) to invalidate the conditional grant to avoid interference or CLI with the UE 115-*b* and the base station 105-*b*.

Figure 3A:
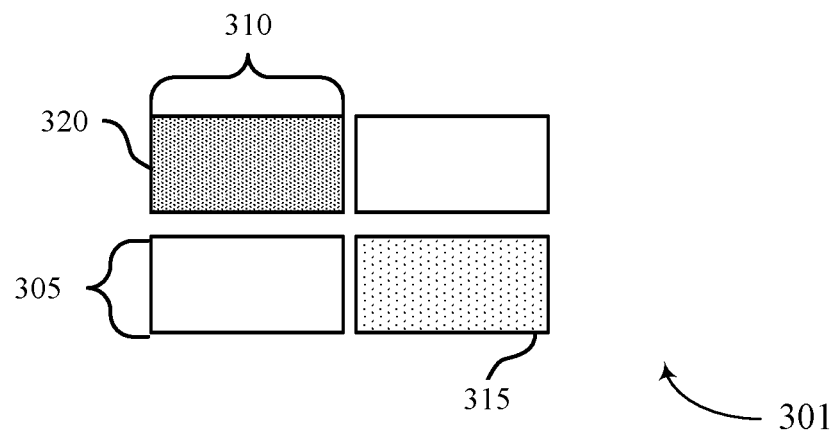
FIGS. 3A and 3B illustrate examples of an interference diagram that supports sidelink based interference management in accordance with aspects of the present disclosure.

FIG. 3A illustrates an example of an interference diagram 301 that supports sidelink based interference management in accordance with aspects of the present disclosure. The interference diagram 301 may represent one or more aspects of the wireless communications system 100 and wireless communications system 201. For example, the interference diagram may reference a first base station (e.g., BS1), a first UE (e.g., UE1), a second base station (e.g., BS2), and a second UE (e.g., UE2), which may be examples of the UE 115 and the base station 105 as described with reference to FIGS. 1, 2A, and 2B.

The interference diagram 301 illustrates resource allocations corresponding to reservations via re-evaluations over sidelink resources to avoid or mitigate potential occurrences of interference between UEs, base stations, or both. For example, a given subchannel 305 and a given sidelink slot 310 may correspond to time division resource allocations (TDRA), frequency division resource allocations (FDRA), or both, that the UE1, UE2, or both may utilize to determine whether a granted downlink or uplink resource may result in interference.

In some examples, UE1 may transmit over PSCCH, PSSCH, or both, a sidelink message to reserve a granted downlink or uplink resource such that other UEs may learn of the reservation via re-evaluation in a receiving sidelink resource pool. In some examples, the sidelink message may carry baseline contents including a flag to indicate whether the sidelink message is a downlink or uplink resource reservation, resource allocations, a priority associated with interference management, or a combination thereof. For example, UE1 may reserve a resource 315 by indicating TDRA, FDRA, or both (e.g., which may correspond to coarse granularities), as well as a resource indicator (RI), precoding matrix indicator (PMI), or both, associated with the granted downlink or uplink resource. Additionally or alternatively, UE1 may indicate a priority associated with interference management to facilitate pre-emption. For example, UE2 may reserve a resource 320, which may not conflict with the resource 315. UE2 may determine the reservation corresponding to UE1 (e.g., the resource 315) by receiving one or more sidelink messages from UE1. The sidelink message of UE1 may be communicated via sidelink from UE1 to UE2, such as through SCI-1, SCI-2, or a joint notification. In some cases, the sidelink message may be carried via a medium access control element (MAC-CE) in a broadcast PSSCH, groupcast PSSCH, or both. In such cases, L2 latency may be suppressed by using a shorter sidelink slot (e.g., with less than 14 symbols, or in a mini-slot).

Figure 3B:
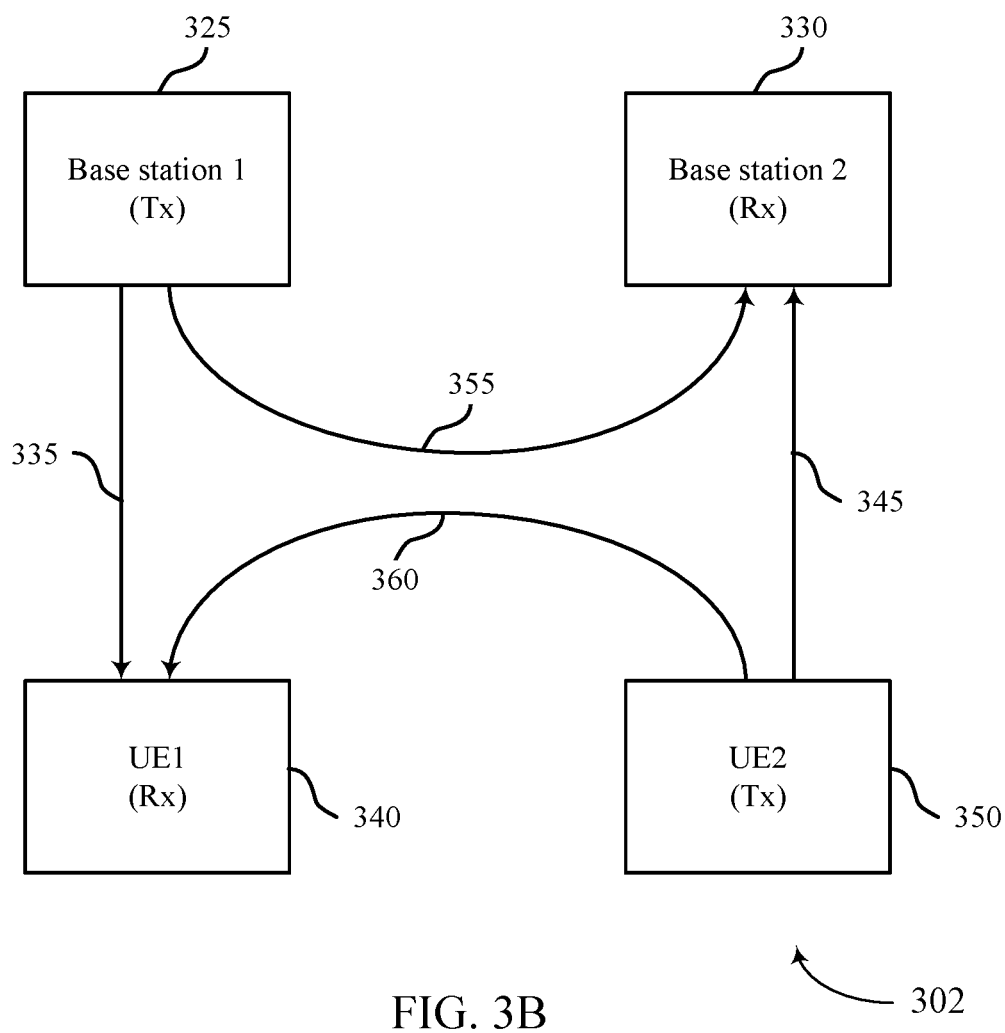

FIG. 3B illustrates an interference diagram 302, where interference may be experienced between BS1, BS2, UE1, UE2, or any combination thereof. As discussed previously with reference to FIGS. 2A and 2B, one or more base stations, one or more UEs, or both, may experience interference from proximate base stations and UEs. For example, BS1 325 may transmit downlink signaling to UE1 340 via a communication link 335. Similarly, BS2 330 may receive uplink signaling from UE2 350 via a communication link 345. In some cases, however, BS2 330 may inadvertently receive downlink signaling destined for UE1 340 over an interference occurrence 355. Similarly, UE1 340 may inadvertently receive uplink signaling destined for BS2 330 over an interference occurrence 360. In such cases, the interference occurrences 360 and 355 may interfere with uplink and downlink communications (e.g., over communication links 335 and 345), which may degrade the overall efficacy of a wireless communications system corresponding to BS1 325, BS2 330, UE1 340, and UE2 350.

As described with reference to FIG. 3A, one or more of UE1 and UE2 may utilize reservations corresponding to a downlink or uplink resource. In some cases, however, UE1, UE2, or both, may further indicate a PHY cell ID (e.g., physical cell identifier (PCI)). In such cases, to save a quantity of bits associated with the reservation, PCI may be replaced with a low-bit base station color code (e.g., a compressed indicator). For example, suppose that UE1 340 sends a reservation carrying an indication of BS1 325. UE2 350 may sense the reservation via a Mode 2 re-evaluation over one or more sidelink resources, as discussed with reference to FIGS. 2A, 2B, and 3A. Upon detecting the reservation, UE2 350 may determine potential downlink to uplink interference from BS1 325 and BS2 330. In such cases, UE2 350 may indicate BS2 330 to apply interference nulling towards BS1 325.

As another example, UE2 350 may transmit a reservation carrying an indication of BS2 330. Upon sensing as part of a Mode 2 re-evaluation, UE1 340 may sense the reservation and determine that PDSCH towards itself (e.g., from BS1 325) may introduce downlink to uplink interference at BS2 330. That is, downlink signaling from BS1 325 to UE1 340 may be inadvertently received by BS2 330, which may result in interference degrading communications operations (e.g., such as when BS2 330 is experiencing heavy uplink loading and may not tolerate any downlink to uplink interference).

To increase the efficacy and latency associated with re-evaluation, PCI, compression indicator, or both may be used to identify co-channel interference. For example, if UE2 350 receives a downlink grant with a compressed indicator, there is a chance of identifying downlink to downlink collisions scheduled by the respective base stations. In such cases, one or more of the UE1 340 or UE2 350 may determine whether interference satisfies a threshold.

In some cases, the determination by UE1 340 or UE2 350 of whether to use the resources scheduled using the conditional grant may be a binary decision based on whether interference exists or not. In such cases, if interference may be present, the UE may refrain from using the resources. In such cases, if interference is not present, the UE may communicate using the resources. In other cases, however, a downlink reservation corresponding to a downlink resource may further include a tolerable uplink to downlink interference level. For example, the interference level may be obtained as a linear average when the downlink resource and uplink resource partially overlap. In such cases, if the interference exceeds a threshold, then the UE may refrain from communicating using the resources granted by the conditional grant. The interference level may be used by a UE (e.g., UE1 340 or UE2 350) that receives a later conditional uplink grant (e.g., a sidelink-gated grant). Together with the interference level, a UE (e.g., UE1 340) may also indicate a sidelink transmission power in the reservation such that UE2 350 can predict uplink to downlink interference from measuring sidelink DMRS from UE1 340 (e.g., under channel reciprocity). In such cases, UE2 350 may transmit a NAK (e.g., or other assistance information) to BS2 330 if the UE2 350 predicts that, as an aggressor, a PUSCH transmitted by UE2 350 may introduce uplink to downlink interference that exceeds the tolerable uplink to downlink interference level.

Additionally or alternatively, the reservation (e.g., sidelink message) corresponding to an uplink resource (e.g., sent by UE2 350) may indicate a difference between an uplink transmission power for the first resource granted by the conditional grant and sidelink transmission power for the sidelink message such that a UE who receives a later conditional downlink grant (e.g., UE1 340) may predict an uplink to downlink interference by measuring sidelink DMRS from UE2 350 as part of re-evaluation under Mode 2). In such cases, UE2 350 may also use the same transmission beam on sidelink and uplink when relatively narrow beamforming is utilized.

In cases where an unacceptable level of interference is determined by one or more UEs as part of re-evaluation for conditional grants, a UE may be configured to transmit a NAK to invalidate the conditional grant when identifying the corresponding interference level. For example, UE1 340 may transmit NAK after identifying overlap with any uplink reservation (e.g., zero-tolerance of interference or CLI). Alternatively, UE1 340 may transmit NAK as an aggressor if there were downlink to uplink interference towards one (e.g., identified by PCI, compressed indicator, or both) of a defined set of base stations that have indicated heavy uplink loading levels.

In some cases, UE1 340 may transmit NAK as a victim of interference if there are uplink reservations that introduce strong uplink to downlink interference, where strong may be defined by an overlap ratio (e.g., the quantity of resource elements that may experience interference as compared with a total quantity of resource elements granted by the conditional grant), an interference power level, or both. For example, the overlap ratio may be defined as a number of resource elements (REs) suffering interference over a total number of REs in the grant. As another example, such as when strong is defined by interference power level, the UE1 340 may measure sidelink DMRS (e.g., with a known transmit power delta between downlink and sidelink, as discussed above) and comparing the delta with a defined threshold depending on an indicated RI, modulation and coding scheme (MCS), or both, within the grant.

Additionally, UE1 340 may be further configured to consider downlink to downlink interference within the Mode 2 re-evaluation procedure. For example, UE1 340 may transmit a NAK as an aggressor if there were downlink to downlink interference towards one of a defined set of base stations who have indicated having high downlink loading levels. Alternatively, UE1 340 may transmit NAK if UE1 340 identifies both downlink to downlink interference and CLI. As another alternative, UE1 340 may transmit a NAK as a victim if interference from both downlink to downlink and uplink to downlink is stronger than a threshold according to the indicated RI, MCS, or both. In such cases, UE1 340 may predict the suffered downlink to downlink interference using the PCI color, base station color, or both (e.g., received via the downlink reservation) together with historical inter-base station radio resource management (RRM) measurements.

In other cases, a UE (e.g., UE1 340) may identify overlapping with a downlink reservation while performing re-evaluation for a conditional uplink grant. In such cases, the UE may transmit a NAK upon identification of the overlap between the downlink reservation and the uplink grant (e.g., zero tolerance of interference). Alternatively, the UE may transmit a NAK as an aggressor when the UE determines it may introduce uplink to downlink interference that is stronger than a tolerable interference level declared within the downlink reservation.

Additionally, a UE (e.g., UE2 350) may be further configured to consider uplink to uplink interference as part of the re-evaluation procedure. In some cases, UE2 350 may transmit NAK if the UE2 350 identifies uplink to uplink interference (e.g., zero tolerance). In some cases, the UE2 350 may transmit NAK if there exists uplink to uplink interference towards one of a defined set of base stations that have indicated having high uplink loading levels (e.g., based on PCI color, base station color, or both).

Alternatively, UE2 350 may transmit NAK if the UE2 350 identifies both uplink to uplink interference and CLI. Lastly, UE2 350 may transmit NAK if UE2 350 detects uplink to downlink interference exceeding a threshold (e.g., UE1 340 as an aggressor) and if there exists uplink to uplink interference.

Figure 4A:
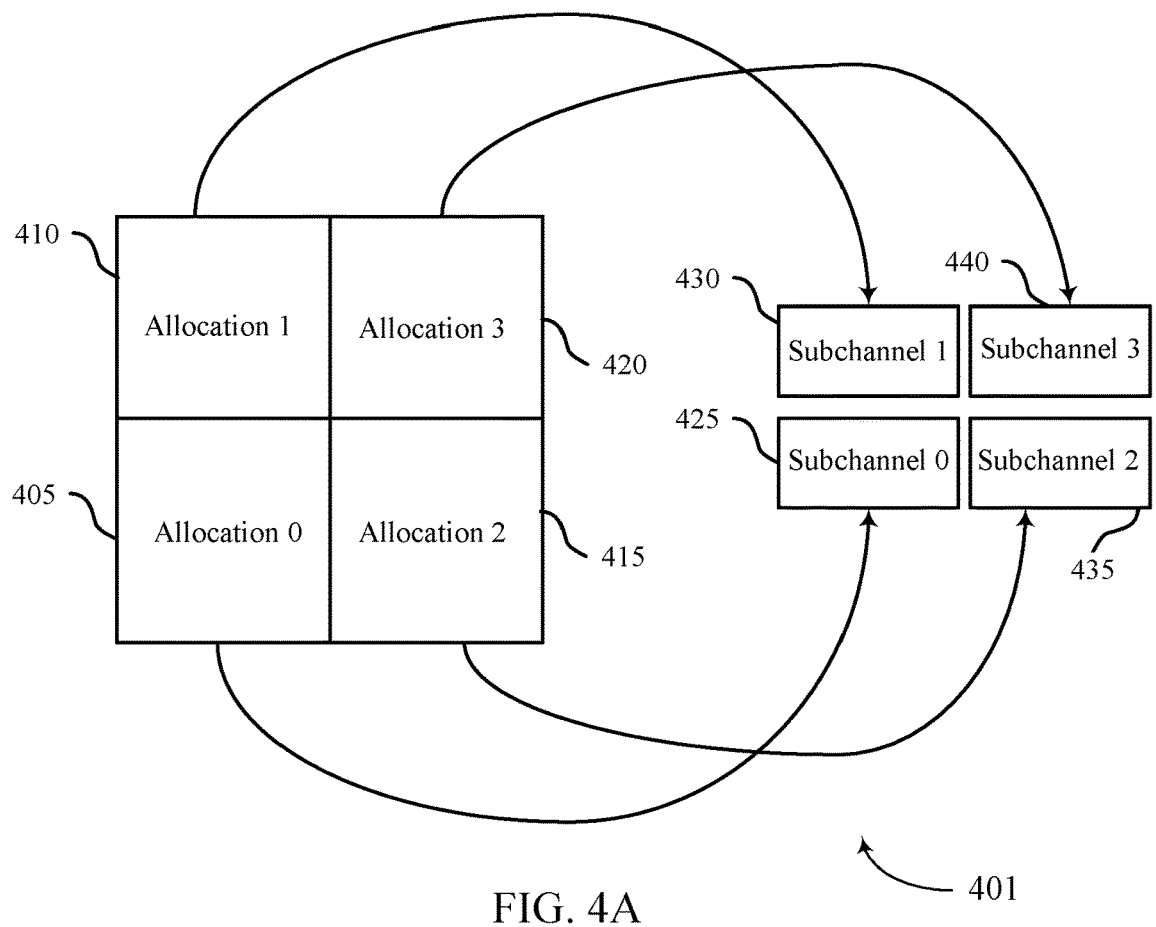
FIGS. 4A and 4B illustrate examples of a resource mapping that supports sidelink based interference management in accordance with aspects of the present disclosure.

FIG. 4A illustrates an example of a resource mapping 401 that supports sidelink based interference management in accordance with aspects of the present disclosure. The resource mapping 401 may represent one or more aspects of the wireless communications system 100, wireless communications system 201, interference diagram 301, and interference diagram 302. For example, the resource mapping 401 may reference a BS1, UE1, BS2, and UE2, which may be examples of the UE 115 and the base station 105 as described with reference to FIG. 1 and FIG. 2.

To perform a sidelink evaluation to identify and/or mitigate potential interference occurrences in wireless communications systems, a UE may utilize a sidelink resource pool resources to determine whether a given Uu resource has been reserved by another UE, a base station, or both. In some examples, the UE may utilize a mapping between uplink/downlink resources and sidelink resources to use for the evaluation purposes. In such cases, the downlink and uplink resources may be partitioned to a sidelink subchannelization. For example, the UE may receive one or more downlink and uplink allocations (e.g., via a conditional grant) from a corresponding base station. That is, the UE may receive a first allocation 405, a second allocation 410, a third allocation 415, and a fourth allocation 420 that are gated based on evaluation over sidelink resources.

To perform the evaluation, the UE may utilize a one-to-one mapping of the resource allocations to identify one or more sidelink subchannels. For example, the UE may determine that the first allocation 405 maps to a first sidelink subchannel 425. Similarly, the UE may determine that the second allocation 410 maps to a second sidelink subchannel 430, the third allocation 415 maps to a third sidelink subchannel 435, and the fourth allocation 420 maps to a fourth sidelink subchannel 440. Based on the mapping, the UE may perform Mode 2 re-evaluation over the implicitly indicated sidelink subchannels to determine if interference occurs, if interference exceeds a threshold, or both.

Figure 4B:
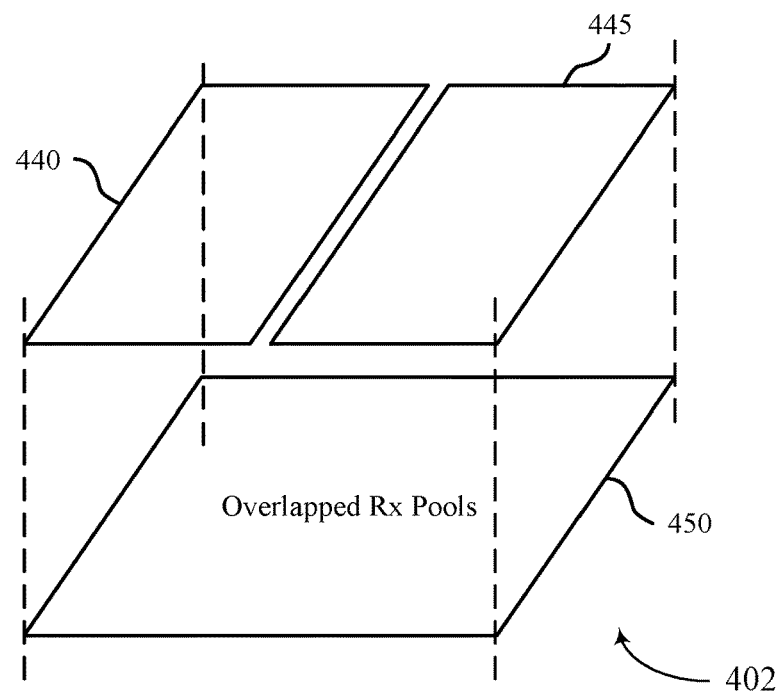

FIG. 4B illustrates a resource mapping 402 exemplifying a usage of a sidelink resource 440, a sidelink resource 445, and overlapping receiving pools 450. Additionally, the sidelink resource 440 may correspond to a sidelink transmission grant from a first base station, while the sidelink resource 445 may correspond to a sidelink transmission grant from a second base station. In such cases, the first base station and the second base station may cooperatively arrange such sidelink transmission grants (e.g., which may be orthogonal) to avoid sidelink transmission collisions. The base stations may also arrange fully overlapping receiving resource pools (e.g., also as a union of two transmission sidelink resource pools) to receive sidelink transmissions.

Figure 5:
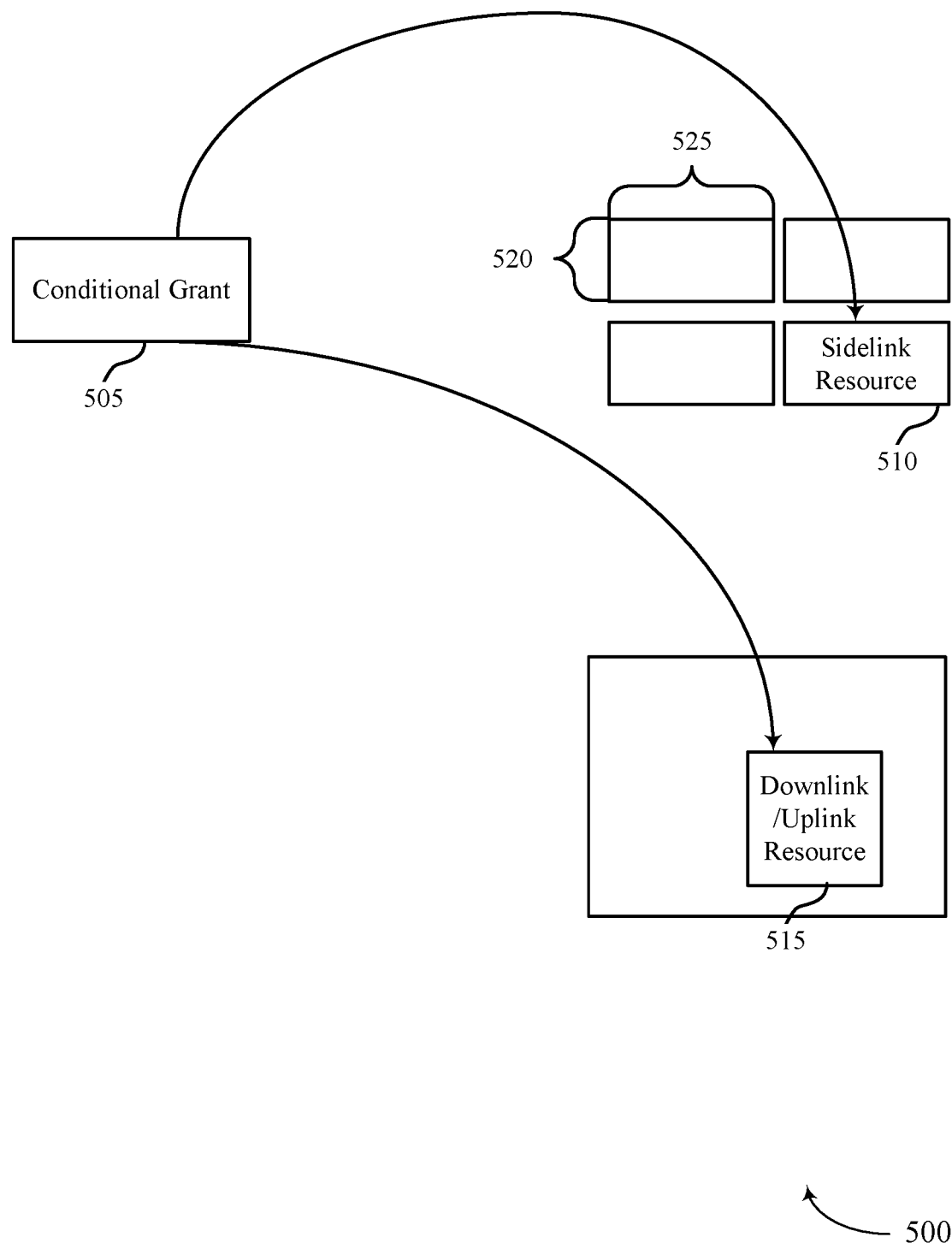
FIG. 5 illustrates an example of a resource mapping that supports sidelink based interference management in accordance with aspects of the present disclosure.

FIG. 5 illustrates an example of a resource mapping 500 that supports sidelink based interference management in accordance with aspects of the present disclosure. The resource mapping 500 may represent one or more aspects of the wireless communications system 100, wireless communications system 201, interference diagram 301, interference diagram 302, resource mapping 401, and resource mapping 402. For example, the resource mapping 500 may reference a BS1, UE1, BS2, and UE2, which may be examples of the UE 115 and the base station 105 as described with reference to FIG. 1 and FIG. 2.

The resource mapping 500 illustrates the usage of an explicit grant for accessing transmission sidelink resource pools (e.g., such as in Mode 1 sidelink channel access), instead of an implicit transmission sidelink resource pool grant as discussed with reference to FIG. 4A. A UE1 may receive a conditional grant 505 (e.g., a sidelink-gated Uu grant for uplink or downlink) from a BS1.

In some cases, the conditional grant 505 may explicitly indicate both a downlink or uplink resource 515 as well as a sidelink resource 510 to use for the sidelink evaluation. The sidelink resource 510 may be indicated by a corresponding subchannel 520 and a sidelink slot 525 such that the UE1 may determine which resources to re-evaluate when determining whether there exists interference between the UE1 and another wireless device (e.g., a BS2, UE2).

Figure 6:
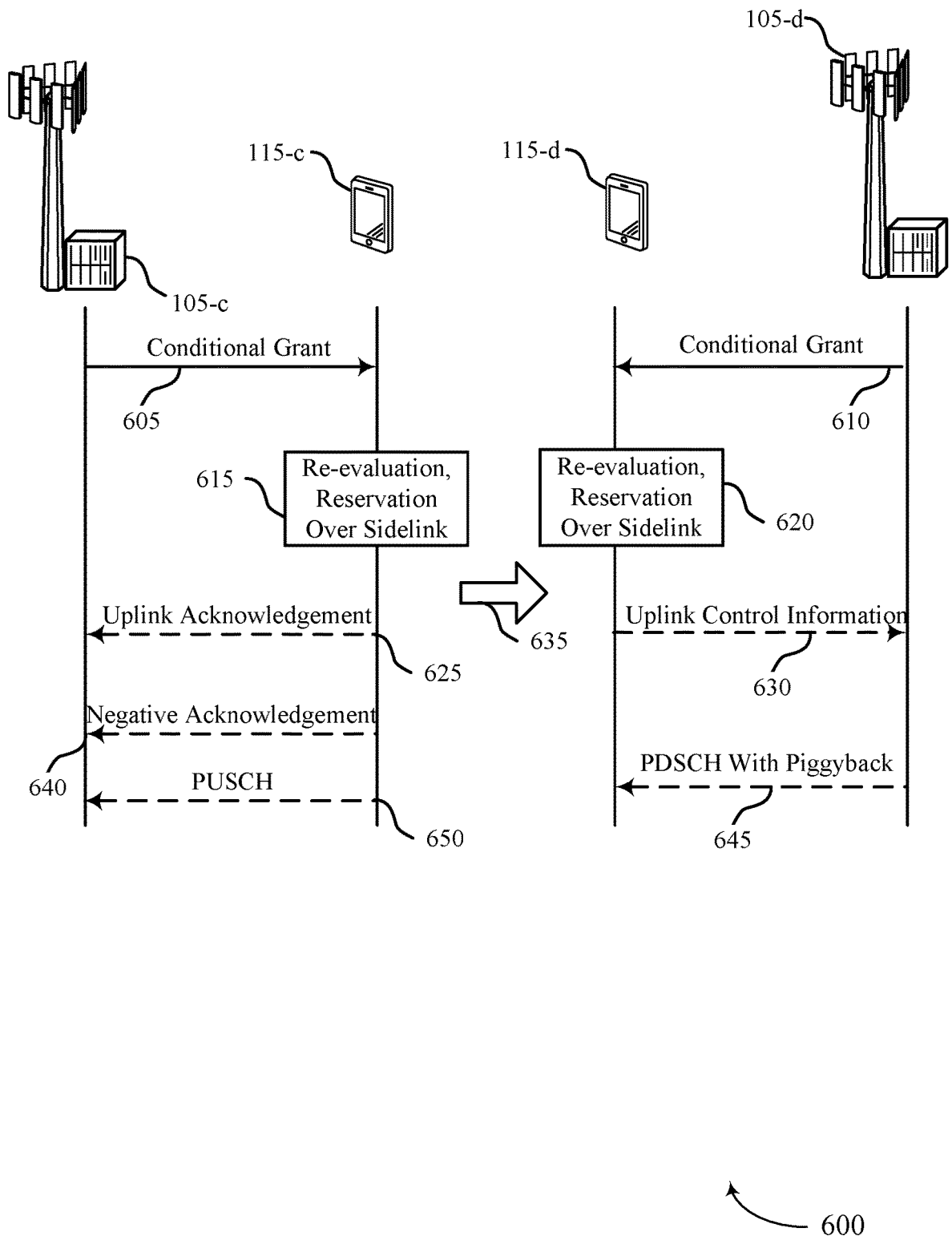
FIG. 6 illustrates an example of a process flow that supports sidelink based interference management in accordance with aspects of the present disclosure.

FIG. 6 illustrates an example of a process flow 600 that supports sidelink based interference management in accordance with aspects of the present disclosure. The process flow 600 may be implemented by one or more aspects of the wireless communications system 100 and the wireless communications system 200. For example, the process flow 600 may correspond to communications between a UE 115-c, a UE 115-d, a base station 105-c, and a base station 105-d, which may be examples of the UE 115 and the base station 105 as described with reference to FIG. 1. While examples are discussed below, any number of devices and device types may be used to accomplish implementations described in the present disclosure. In the following description of the process flow 600, operations between the UEs 115-c and 115-d as well as base stations 105-c and 105-d may occur in a different order, at different times, or by different devices than as shown.

At 605, the UE 115-c may receive, from the base station 105-c, a conditional grant (e.g., downlink) to facilitate flexible-division duplex with controllable interference. Similarly, at 610, the UE 115-d may receive a conditional grant from the base station 105-d (e.g., uplink grant). The grant may include a sidelink resource, an additional PUCCH ACK/NACK resource, or any combination thereof.

At 615, upon receiving the grant, the UE 115-c may perform a sidelink evaluation with respect to the granted downlink or uplink resource by parsing reservations received in the Rx sidelink resource pool by utilizing a sensing window for re-evaluation as discussed with reference to FIGS. 1 and 2. Similarly, at 620, the UE 115-d may perform re-evaluation and reservation over sidelink resources.

In some cases, when receiving the uplink conditional grant and determining that there exists no interference or an acceptable level of interference, the UE 115-d may be configured to directly transmit PUSCH without transmitting a PUCCH ACK. The UE 115-d may transmit the reservation with respect to the uplink resource over the transmission sidelink resource pool, while additionally reporting what the UE 115-d has detected in the re-evaluation procedure. In such cases, the UE 115-d may optionally at 630, transmit a piggy-backed uplink control information on PUSCH indicating the successful re-evaluation.

Alternatively, the UE 115-d may obtain other information for reporting to the base station 105-d, 105-c, or both beyond ACK/NACK. For this purpose, the UE 115-d, 115-c, or both, may be provided with a resource for transmitting a multi-bit uplink control information (UCI) at 630. For example, for a downlink conditional grant, UE 115-c may determine channel state information when performing sidelink re-evaluation at 615 considering uplink to downlink interference as well as inter-base station downlink to downlink interference by utilizing multi-bit channel state information (CSI) in UCI at 625. Additionally, at 630, the UE 115-d may utilize the uplink conditional grant to indicate who is the strongest downlink to uplink interference source such that the base station 105-d may perform corresponding interference nulling using PCI color, base station color, or both, in UCI for the dominating interference.

Additionally, after receiving UCI at 630 for a downlink conditional grant, the base station 105-c may change a rate-control set-ups and carry a piggy-backed DCI within a scheduled PDSCH. Upon transmitting UCI, the UE 115-d may search for a piggy-backed DCI in the granted PDSCH, which may replace sending NAK to invalidate the downlink grant, reducing signaling overhead within the communications system.

Depending on the re-evaluations at 615 and 620, the UE 115-c, the UE 115-d, or both may transmit a negative acknowledgement (e.g., if the UE 115-c, UE 115-d, or both determine that there exists an unacceptable level of interference. For example, at 640, the UE 115-c may transmit a negative acknowledgement (e.g., NAK) to the base station 105-c based on detecting interference that exceeds a threshold. Otherwise, at 650, the UE 115-c may transmit signaling over PUSCH to the base station 105-c.

Figure 7:
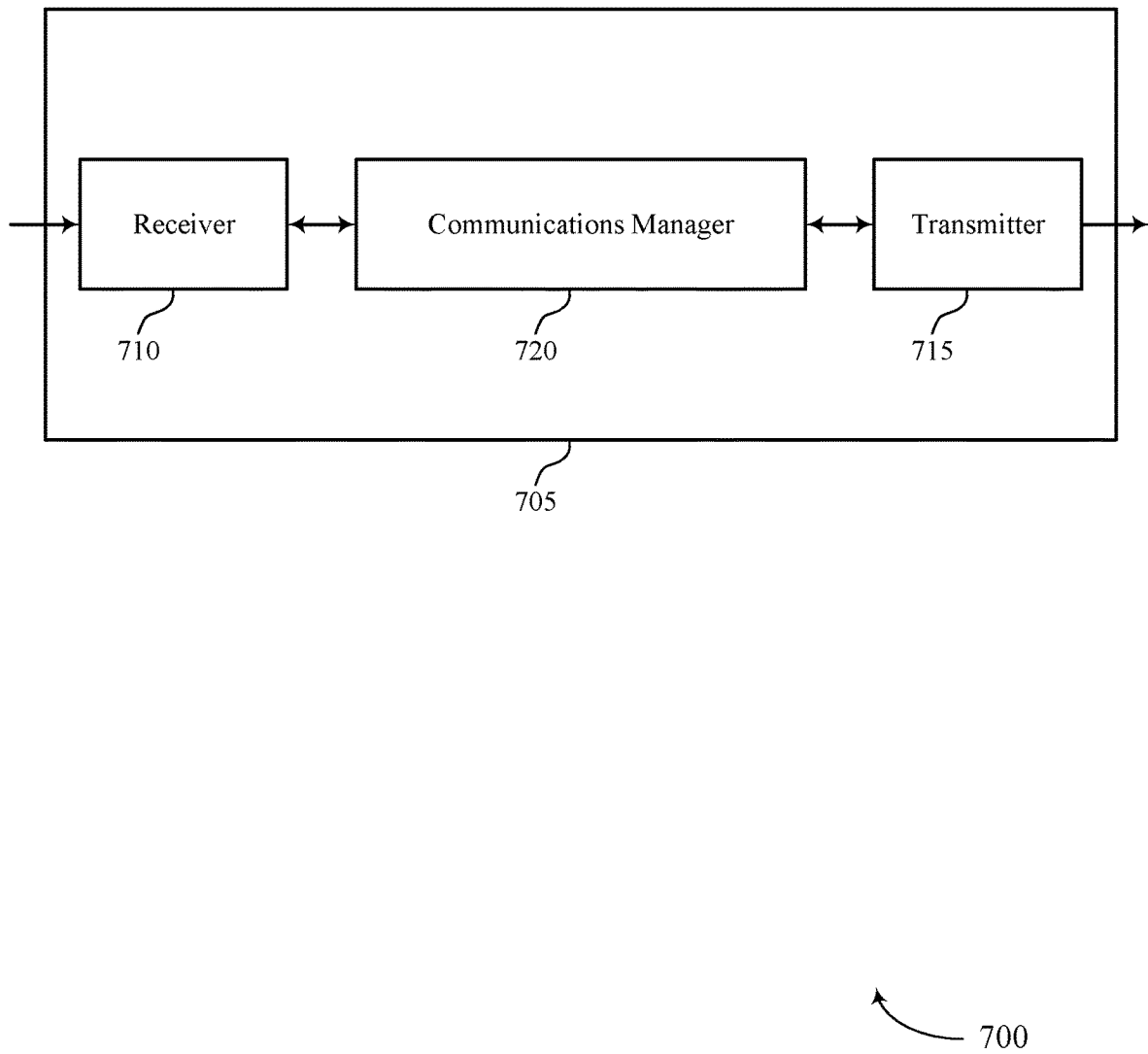
FIGS. 7 and 8 show block diagrams of devices that support sidelink based interference management in accordance with aspects of the present disclosure.

FIG. 7 shows a block diagram 700 of a device 705 that supports sidelink based interference management in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sidelink based interference management). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sidelink based interference management). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of sidelink based interference management as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, a conditional grant that schedules a first resource for communications between the UE and the base station, the conditional grant including a first indication to use a sidelink resource to identify a likelihood of interference between different base stations communicating using the first resource. The communications manager 720 may be configured as or otherwise support a means for monitoring the sidelink resource for a second indication of interference associated with the first resource based on receiving the conditional grant. The communications manager 720 may be configured as or otherwise support a means for transmitting, to the base station using a second resource, a third indication of whether the interference associated with the first resource of the conditional grant satisfies one or more criteria based on monitoring the sidelink resource.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, more efficient utilization of communication resources by utilizing Mode 2 re-evaluation to determine if there exists CLI, determine whether detected CLI satisfies a threshold, or both.

Figure 8:
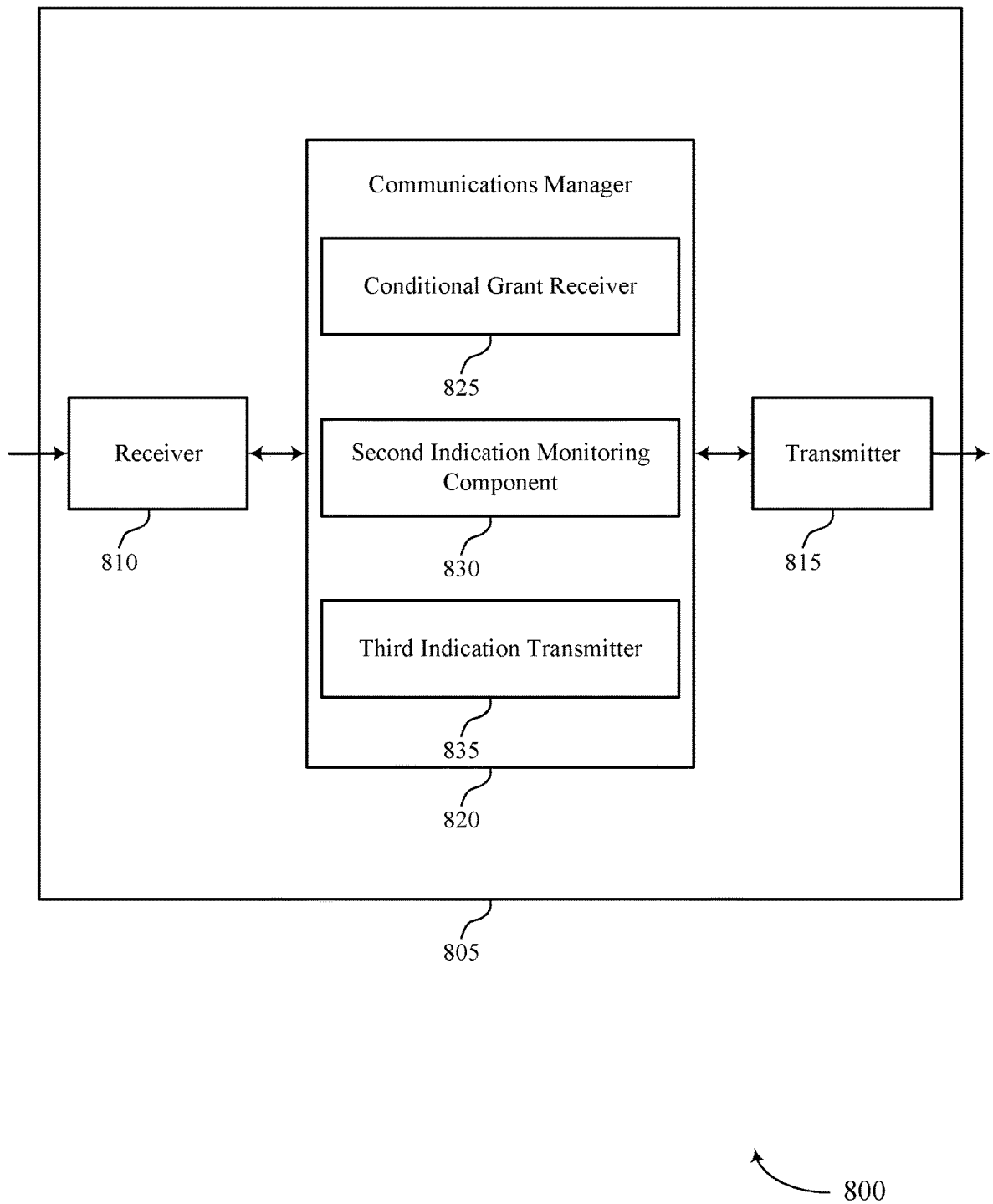

FIG. 8 shows a block diagram 800 of a device 805 that supports sidelink based interference management in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to sidelink based interference management). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to sidelink based interference management). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of sidelink based interference management as described herein. For example, the communications manager 820 may include a conditional grant receiver 825, a second indication monitoring component 830, a third indication transmitter 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The conditional grant receiver 825 may be configured as or otherwise support a means for receiving, from a base station, a conditional grant that schedules a first resource for communications between the UE and the base station, the conditional grant including a first indication to use a sidelink resource to identify a likelihood of interference between different base stations communicating using the first resource. The second indication monitoring component 830 may be configured as or otherwise support a means for monitoring the sidelink resource for a second indication of interference associated with the first resource based on receiving the conditional grant. The third indication transmitter 835 may be configured as or otherwise support a means for transmitting, to the base station using a second resource, a third indication of whether the interference associated with the first resource of the conditional grant satisfies one or more criteria based on monitoring the sidelink resource.

Figure 9:
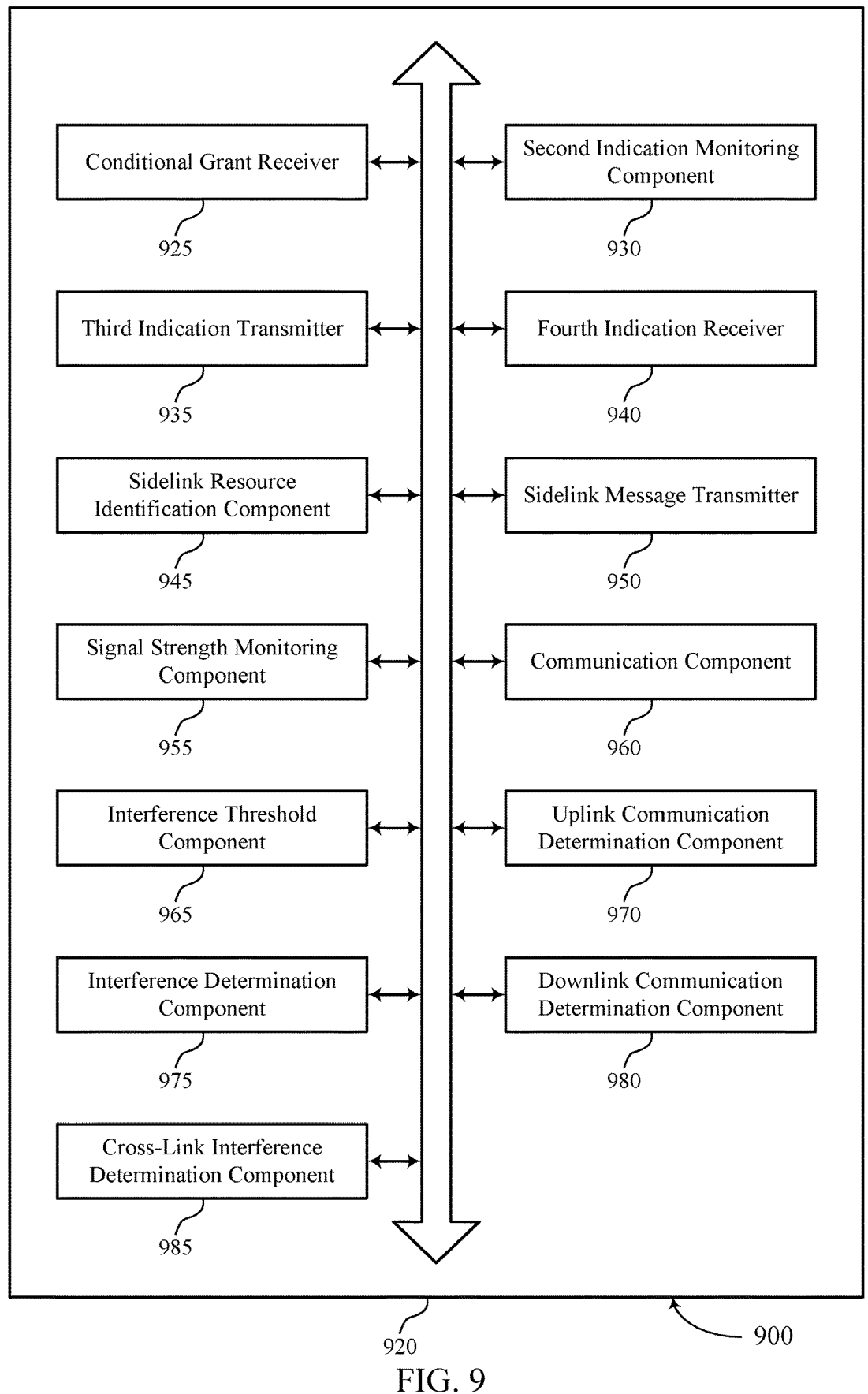
FIG. 9 shows a block diagram of a communications manager that supports sidelink based interference management in accordance with aspects of the present disclosure.

FIG. 9 shows a block diagram 900 of a communications manager 920 that supports sidelink based interference management in accordance with aspects of the present disclosure. The communications manager 920 may be an example of aspects of a communications manager 720, a communications manager 820, or both, as described herein. The communications manager 920, or various components thereof, may be an example of means for performing various aspects of sidelink based interference management as described herein. For example, the communications manager 920 may include a conditional grant receiver 925, a second indication monitoring component 930, a third indication transmitter 935, a fourth indication receiver 940, a sidelink resource identification component 945, a sidelink message transmitter 950, a signal strength monitoring component 955, a communication component 960, an interference threshold component 965, an uplink communication determination component 970, an interference determination component 975, a downlink communication determination component 980, a cross-link interference determination component 985, or any combination thereof. Each of these components may communicate, directly or indirectly, with one another (e.g., via one or more buses).

The communications manager 920 may support wireless communication at a UE in accordance with examples as disclosed herein. The conditional grant receiver 925 may be configured as or otherwise support a means for receiving, from a base station, a conditional grant that schedules a first resource for communications between the UE and the base station, the conditional grant including a first indication to use a sidelink resource to identify a likelihood of interference between different base stations communicating using the first resource. The second indication monitoring component 930 may be configured as or otherwise support a means for monitoring the sidelink resource for a second indication of interference associated with the first resource based on receiving the conditional grant. The third indication transmitter 935 may be configured as or otherwise support a means for transmitting, to the base station using a second resource, a third indication of whether the interference associated with the first resource of the conditional grant satisfies one or more criteria based on monitoring the sidelink resource.

In some examples, the fourth indication receiver 940 may be configured as or otherwise support a means for receiving, as part of the conditional grant, a fourth indication of the sidelink resource used to identify the likelihood of interference associated with the first resource, where monitoring the sidelink resource is based on receiving the fourth indication of the sidelink resource.

In some examples, the sidelink resource identification component 945 may be configured as or otherwise support a means for identifying the sidelink resource based on a mapping between the first resource and one or more sidelink resources, where monitoring the sidelink resource is based on identifying the sidelink resource.

In some examples, the sidelink message transmitter 950 may be configured as or otherwise support a means for transmitting, over the sidelink resource, a sidelink message to reserve the first resource for communication with the base station, where transmitting the third indication to the base station is based on transmitting the sidelink message.

In some examples, the sidelink message includes a fourth indication of the first resource.

In some examples, the sidelink message is included in sidelink control information, a MAC-CE in broadcast physical sidelink shared channel, groupcast physical sidelink shared channel, or a combination thereof.

In some examples, the sidelink message includes a flag that the first resource is reserved for uplink communications or downlink communications.

In some examples, the sidelink message includes a physical cell identifier of the base station or a compressed indicator of the base station.

In some examples, the sidelink message indicates a value of a threshold to compare with the interference associated with the first resource, and the interference threshold component 965 may be configured as or otherwise support a means for determining whether the interference satisfies the threshold, where transmitting the third indication is based on the determination.

In some examples, the sidelink message further indicates a difference between a transmit power associated with the first resource and a transmit power associated with the sidelink resource.

In some examples, the fourth indication receiver 940 may be configured as or otherwise support a means for receiving, as part of the conditional grant, a fourth indication of the second resource used to transmit the third indication, where transmitting the third indication to the base station over the second resource is based on receiving the fourth indication of the second resource.

In some examples, to support monitoring the sidelink resource, the signal strength monitoring component 955 may be configured as or otherwise support a means for monitoring a signal strength received over the sidelink resource, where transmitting the third indication is based on monitoring the signal strength.

In some examples, monitoring the signal strength is part of a contention-based channel access protocol associated with the sidelink resource.

In some examples, the communication component 960 may be configured as or otherwise support a means for communicating, with the base station, over the first resource based on the interference associated with the first resource of the conditional grant being below a threshold.

In some examples, the third indication includes an acknowledgement that the UE is using the first resource for communications scheduled by the conditional grant.

In some examples, the communication component 960 may be configured as or otherwise support a means for refraining from communicating with the base station over the first resource based on the interference associated with the first resource of the conditional grant being above a threshold.

In some examples, the third indication includes a negative acknowledgement that the UE is failing to use the first resource for communications scheduled by the conditional grant.

In some examples, the first resource includes a downlink communication between the base station and the UE, and the uplink communication determination component 970 may be configured as or otherwise support a means for determining that an uplink communication between a second base station and a second UE is scheduled to use the first resource, where refraining from communicating is based on the determination.

In some examples, the first resource includes a downlink communication between the base station and the UE, and the interference determination component 975 may be configured as or otherwise support a means for determining that the interference between the first resource used for communications between the base station and the UE is caused by an uplink communication between a second base station and a second UE, the second base station being associated with the base station, where refraining from communicating is based on the determination.

In some examples, the first resource includes a downlink communication between the base station and the UE, and the interference determination component 975 may be configured as or otherwise support a means for determining that the interference between the first resource used for communications between the base station and the UE is caused by an uplink communication between a second base station and a second UE and that the interference is above the threshold, where refraining from communicating is based on the determination.

In some examples, the likelihood of interference is determined based on a quantity of resource elements of the first resource experiencing the interference with a link between a second base station and a second UE, a set of sidelink demodulation reference signals satisfying one or more thresholds, or both.

In some examples, the first resource includes a first downlink communication between the base station and the UE, and the downlink communication determination component 980 may be configured as or otherwise support a means for determining that a second downlink communication between a second base station and a second UE is scheduled to use the first resource, where refraining from communicating is based on the determination.

In some examples, the first resource includes a first downlink communication between the base station and the UE, and the interference determination component 975 may be configured as or otherwise support a means for determining that the interference between the first resource used for communications between the base station and the UE is caused by a second downlink communication between a second base station and a second UE, the second base station being associated with the base station, where refraining from communicating is based on the determination.

In some examples, the first resource includes a first downlink communication between the base station and the UE, and the interference determination component 975 may be configured as or otherwise support a means for determining that the interference between the first resource used for communications between the base station and the UE is caused by a second downlink communication between a second base station and a second UE. In some examples, the first resource includes a first downlink communication between the base station and the UE, and the cross-link interference determination component 985 may be configured as or otherwise support a means for determining that the interference includes cross-link interference with an uplink communication, where refraining from communicating is based on the determinations.

In some examples, the first resource includes an uplink communication between the base station and the UE, and the downlink communication determination component 980 may be configured as or otherwise support a means for determining that a downlink communication between a second base station and a second UE is scheduled to use the first resource, where refraining from communicating is based on the determination.

In some examples, the first resource includes an uplink communication between the base station and the UE, and the interference threshold component 965 may be configured as or otherwise support a means for determining that the interference between the first resource used for communications between the base station and the UE is caused by a downlink communication between a second base station and a second UE and that the interference being above the threshold, where refraining from communicating is based on the determination.

In some examples, the first resource includes a first uplink communication between the base station and the UE, and the uplink communication determination component 970 may be configured as or otherwise support a means for determining that a second uplink communication between a second base station and a second UE is scheduled to use the first resource, where refraining from communicating is based on the determination.

In some examples, the first resource includes a first uplink communication between the base station and the UE, and the interference determination component 975 may be configured as or otherwise support a means for determining that the interference between the first resource used for communications between the base station and the UE is caused by a second uplink communication between a second base station and a second UE, the second base station being associated with the base station, where refraining from communicating is based on the determination.

In some examples, the first resource includes a first uplink communication between the base station and the UE, and the interference determination component 975 may be configured as or otherwise support a means for determining that the interference between the first resource used for communications between the base station and the UE is caused by a second uplink communication between a second base station and a second UE. In some examples, the first resource includes a first uplink communication between the base station and the UE, and the cross-link interference determination component 985 may be configured as or otherwise support a means for determining that the interference includes cross-link interference with an uplink communication, where refraining from communicating is based on the determinations.

In some examples, the interference includes cross-link interference between base stations transmitting and receiving over a same frequency resource in a time division duplexing scheme, the cross-link interference corresponding to uplink-to-downlink interference.

In some examples, the conditional grant includes a sidelink gated downlink and uplink grant.

In some examples, the third indication includes information identified in response to monitoring the sidelink resource and the third indication is transmitted as part of uplink control information.

In some examples, the third indication includes a physical uplink shared channel transmission.

Figure 10:
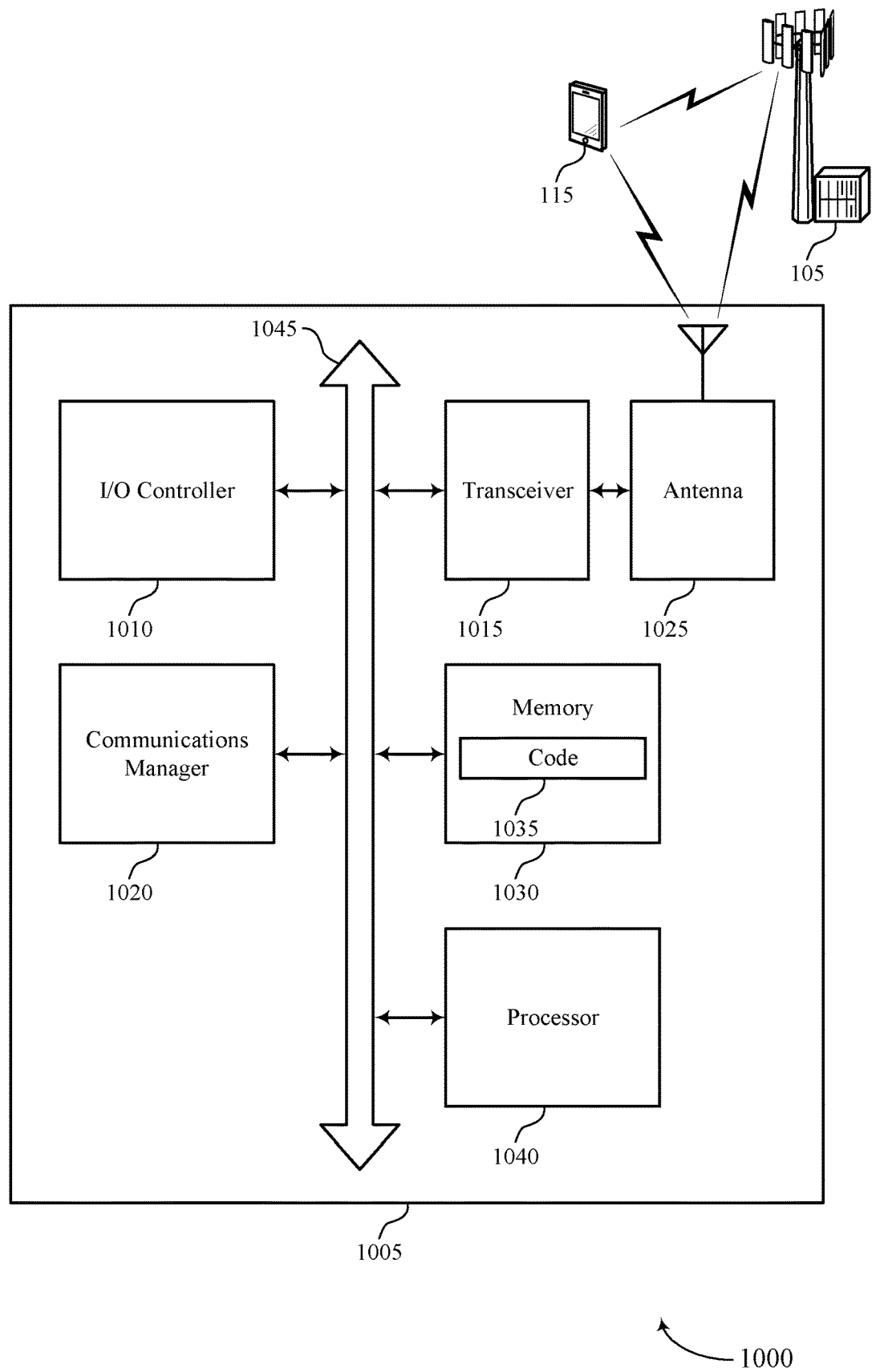
FIG. 10 shows a diagram of a system including a device that supports sidelink based interference management in accordance with aspects of the present disclosure.

FIG. 10 shows a diagram of a system 1000 including a device 1005 that supports sidelink based interference management in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sidelink based interference management). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, a conditional grant that schedules a first resource for communications between the UE and the base station, the conditional grant including a first indication to use a sidelink resource to identify a likelihood of interference between different base stations communicating using the first resource. The communications manager 1020 may be configured as or otherwise support a means for monitoring the sidelink resource for a second indication of interference associated with the first resource based on receiving the conditional grant. The communications manager 1020 may be configured as or otherwise support a means for transmitting, to the base station using a second resource, a third indication of whether the interference associated with the first resource of the conditional grant satisfies one or more criteria based on monitoring the sidelink resource.

By including or configuring the communications manager 1020 in accordance with examples as described herein, the device 1005 may support techniques for improved communication reliability, reduced power consumption, more efficient utilization of communication resources, and improved coordination between devices by utilizing Mode 2 re-evaluation to determine if there exists CLI, determine whether detected CLI satisfies a threshold, or both.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of sidelink based interference management as described herein, or the processor 1040 and the memory 1030 may be otherwise configured to perform or support such operations.

Figure 11:
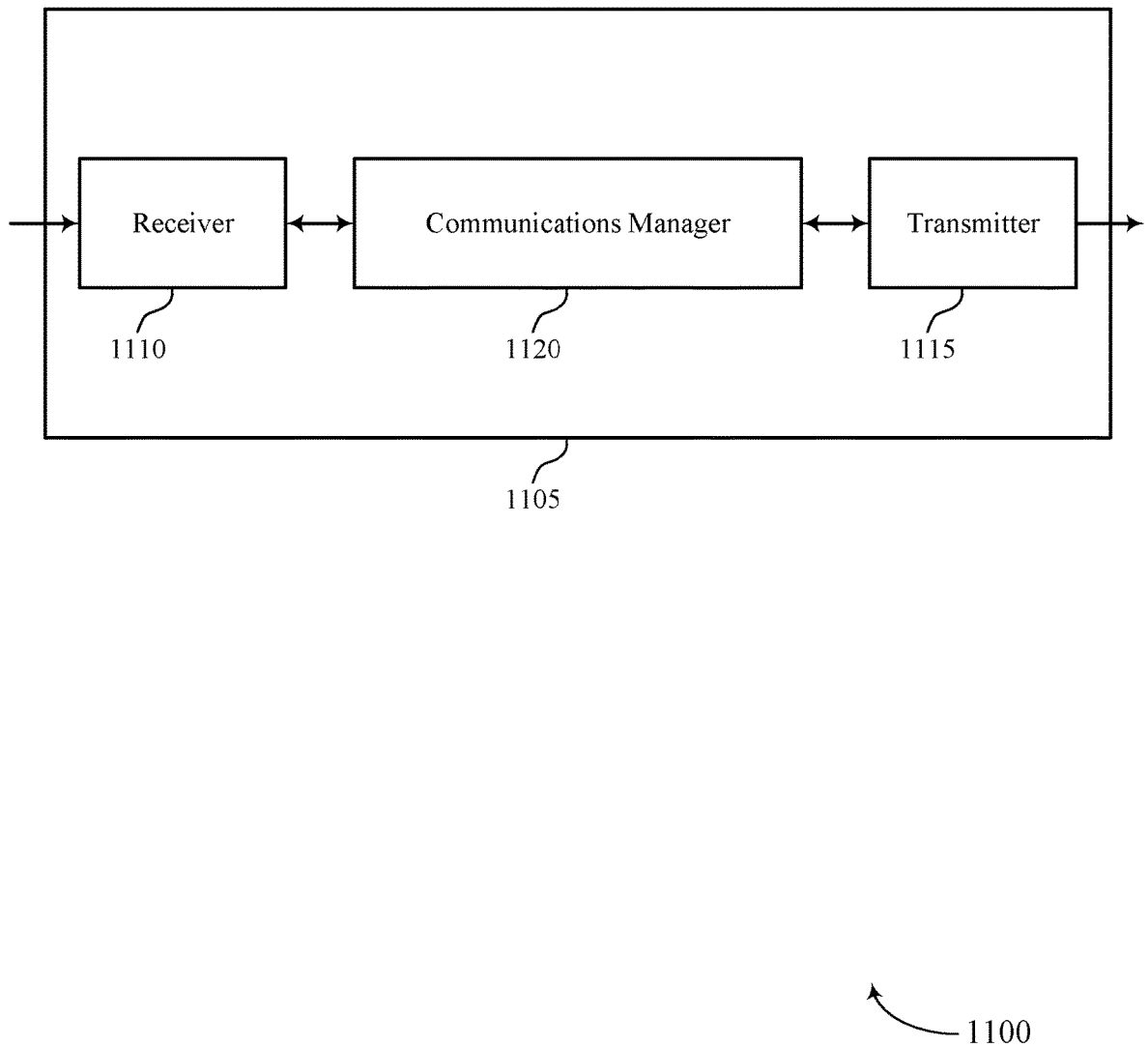
FIGS. 11 and 12 show block diagrams of devices that support sidelink based interference management in accordance with aspects of the present disclosure.

FIG. 11 shows a block diagram 1100 of a device 1105 that supports sidelink based interference management in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to sidelink based interference management). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to sidelink based interference management). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of sidelink based interference management as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a UE, a conditional grant that schedules a first resource for communications between the UE and the base station, the conditional grant including a first indication to use a sidelink resource to identify a likelihood of interference between different base stations communicating using the first resource. The communications manager 1120 may be configured as or otherwise support a means for receiving, from the UE using a second resource, a second indication of whether the interference associated with the first resource of the conditional grant satisfies one or more criteria based on transmitting the conditional grant.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, more efficient utilization of communication resources by utilizing Mode 2 re-evaluation to determine if there exists CLI, determine whether detected CLI satisfies a threshold, or both.

Figure 12:
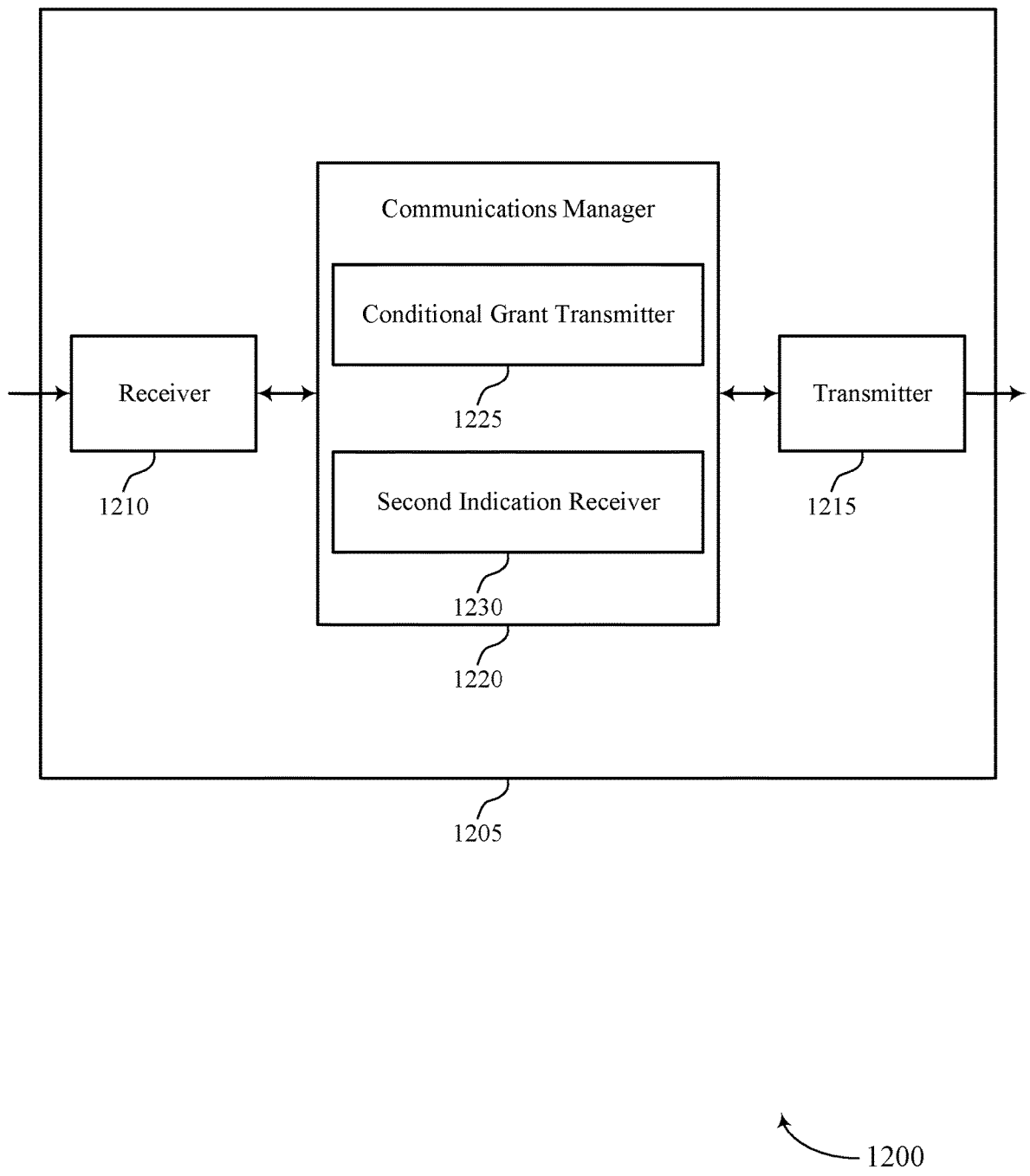

FIG. 12 shows a block diagram 1200 of a device 1205 that supports sidelink based interference management in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to sidelink based interference management). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to sidelink based interference management). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of sidelink based interference management as described herein. For example, the communications manager 1220 may include a conditional grant transmitter 1225 a second indication receiver 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The conditional grant transmitter 1225 may be configured as or otherwise support a means for transmitting, to a UE, a conditional grant that schedules a first resource for communications between the UE and the base station, the conditional grant including a first indication to use a sidelink resource to identify a likelihood of interference between different base stations communicating using the first resource. The second indication receiver 1230 may be configured as or otherwise support a means for receiving, from the UE using a second resource, a second indication of whether the interference associated with the first resource of the conditional grant satisfies one or more criteria based on transmitting the conditional grant.

Figure 13:
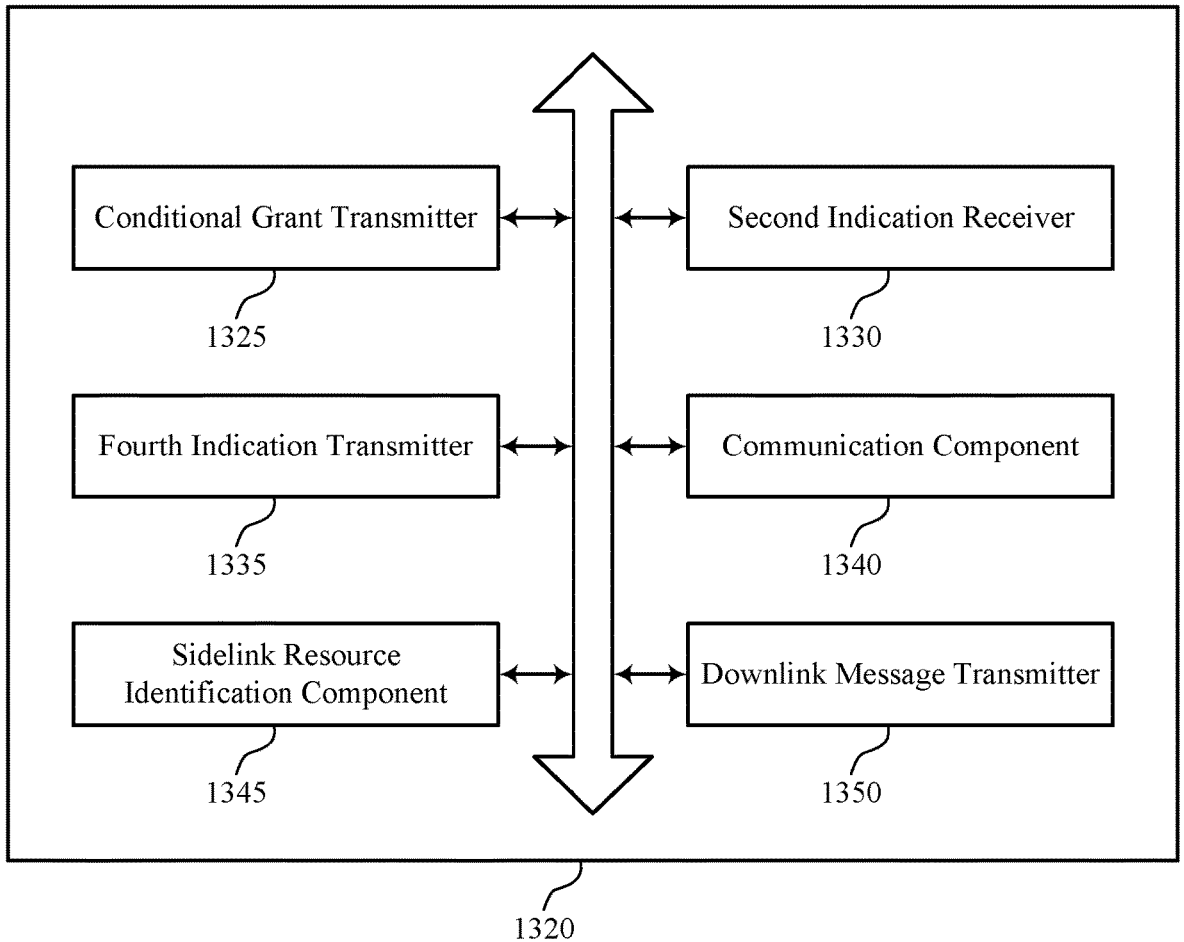
FIG. 13 shows a block diagram of a communications manager that supports sidelink based interference management in accordance with aspects of the present disclosure.

FIG. 13 shows a block diagram 1300 of a communications manager 1320 that supports sidelink based interference management in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of sidelink based interference management as described herein. For example, the communications manager 1320 may include a conditional grant transmitter 1325, a second indication receiver 1330, a fourth indication transmitter 1335, a communication component 1340, a sidelink resource identification component 1345, a downlink message transmitter 1350, or any combination thereof. Each of these components may communicate, directly or indirectly, with one another (e.g., via one or more buses).

The communications manager 1320 may support wireless communications at a base station in accordance with examples as disclosed herein. The conditional grant transmitter 1325 may be configured as or otherwise support a means for transmitting, to a UE, a conditional grant that schedules a first resource for communications between the UE and the base station, the conditional grant including a first indication to use a sidelink resource to identify a likelihood of interference between different base stations communicating using the first resource. The second indication receiver 1330 may be configured as or otherwise support a means for receiving, from the UE using a second resource, a second indication of whether the interference associated with the first resource of the conditional grant satisfies one or more criteria based on transmitting the conditional grant.

In some examples, the fourth indication transmitter 1335 may be configured as or otherwise support a means for transmitting, as part of the conditional grant, a fourth indication of the sidelink resource used to identify the likelihood of interference associated with the first resource.

In some examples, the communication component 1340 may be configured as or otherwise support a means for communicating with a second base station to identify sidelink resources used to identify the likelihood of interference between different base stations. In some examples, the sidelink resource identification component 1345 may be configured as or otherwise support a means for identifying one or more sidelink resources for use by UEs associated with the base station to transmit sidelink messages, where transmitting the first indication is based on the identifying.

In some examples, the downlink message transmitter 1350 may be configured as or otherwise support a means for transmitting, to the UE, a downlink message based on receiving the second indication, where the downlink message is scheduled by the conditional grant and includes downlink control information.

In some examples, the fourth indication transmitter 1335 may be configured as or otherwise support a means for transmitting, as part of the conditional grant, a fourth indication of the second resource used to receive the second indication, where receiving the second indication from the UE over the second resource is based on transmitting the fourth indication of the second resource.

In some examples, the communication component 1340 may be configured as or otherwise support a means for communicating, with the UE, over the first resource based on the interference associated with the first resource of the conditional grant being below a threshold.

In some examples, the second indication includes an acknowledgement that the UE is using the first resource for communications scheduled by the conditional grant.

In some examples, the communication component 1340 may be configured as or otherwise support a means for refraining from communicating with the UE over the first resource based on the interference associated with the first resource of the conditional grant being above a threshold.

In some examples, the second indication includes a negative acknowledgement that the UE is failing to use the first resource for communications scheduled by the conditional grant.

In some examples, the interference includes cross-link interference between base stations transmitting and receiving over a same frequency resource in a time division duplexing scheme, the cross-link interference corresponding to uplink-to-downlink interference.

In some examples, the conditional grant includes a sidelink gated downlink and uplink grant.

In some examples, the second indication is received as part of uplink control information.

In some examples, the second indication includes a physical uplink shared channel transmission.

Figure 14:
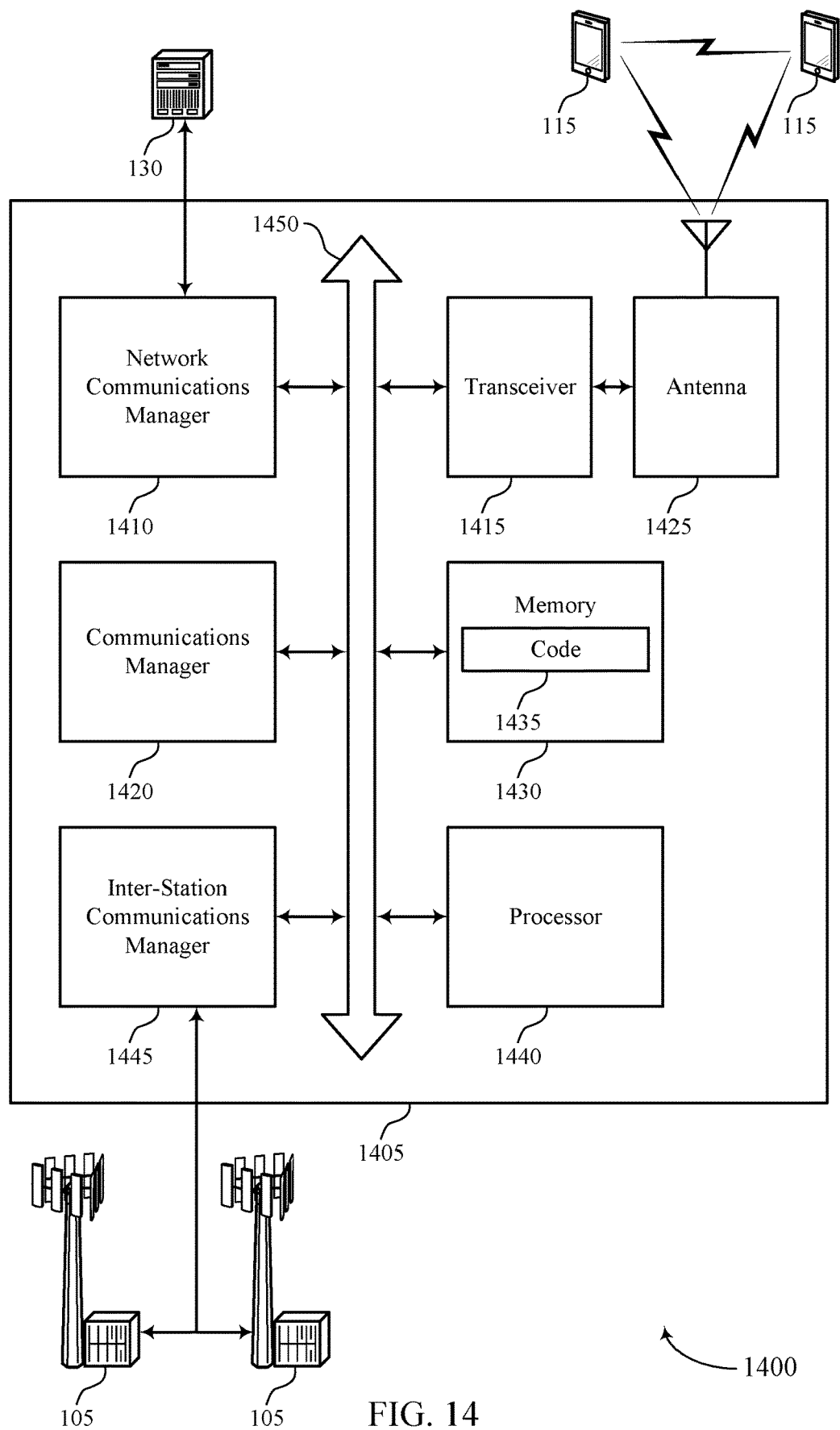
FIG. 14 shows a diagram of a system including a device that supports sidelink based interference management in accordance with aspects of the present disclosure.

FIG. 14 shows a diagram of a system 1400 including a device 1405 that supports sidelink based interference management in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting sidelink based interference management). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a UE, a conditional grant that schedules a first resource for communications between the UE and the base station, the conditional grant including a first indication to use a sidelink resource to identify a likelihood of interference between different base stations communicating using the first resource. The communications manager 1420 may be configured as or otherwise support a means for receiving, from the UE using a second resource, a second indication of whether the interference associated with the first resource of the conditional grant satisfies one or more criteria based on transmitting the conditional grant.

By including or configuring the communications manager 1420 in accordance with examples as described herein, the device 1405 may support techniques for improved communication reliability, reduced power consumption, more efficient utilization of communication resources, and improved coordination between devices by utilizing Mode 2 re-evaluation to determine if there exists CLI, determine whether detected CLI satisfies a threshold, or both.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of sidelink based interference management as described herein, or the processor 1440 and the memory 1430 may be otherwise configured to perform or support such operations.

Figure 15:
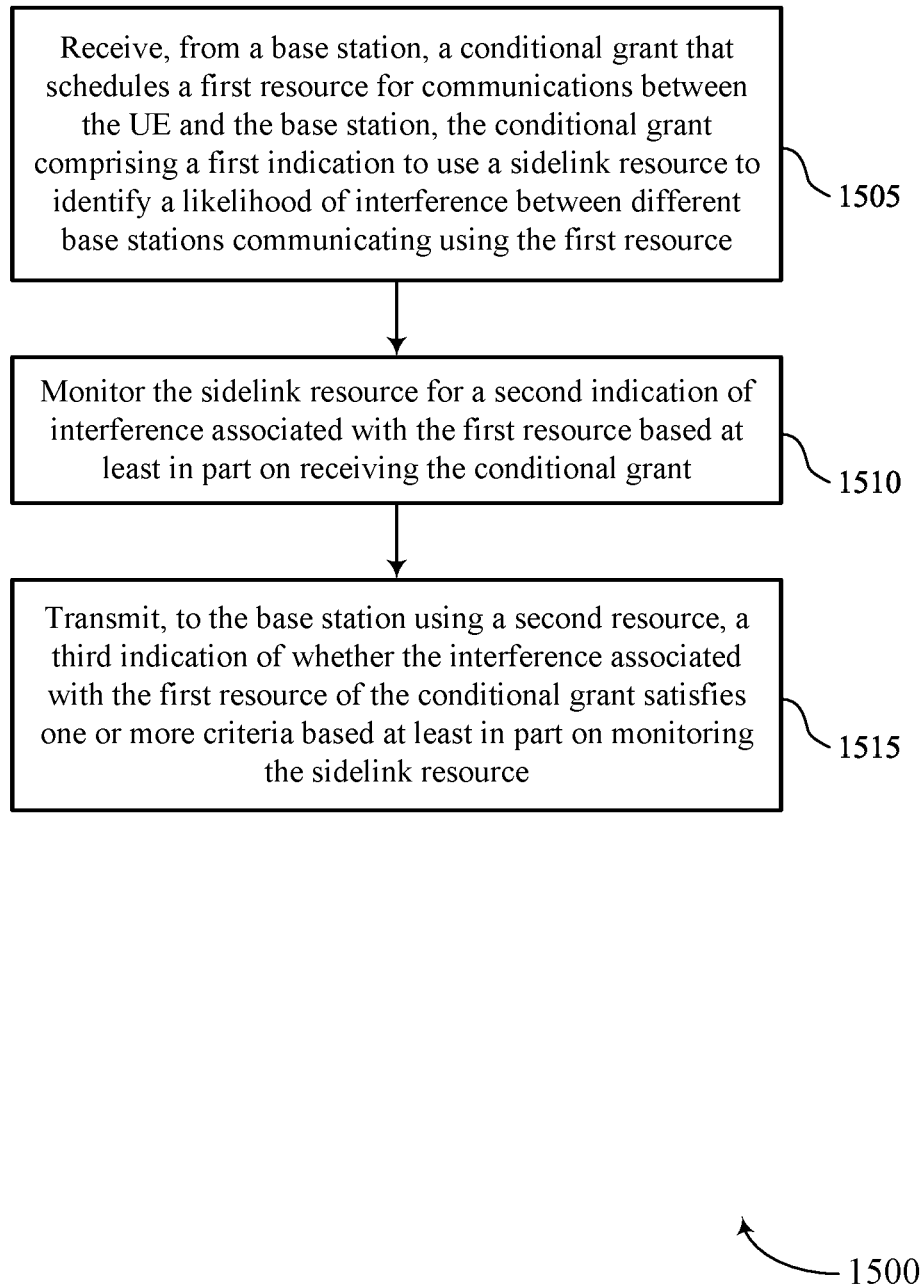
FIGS. 15 through 17 show flowcharts illustrating methods that support sidelink based interference management in accordance with aspects of the present disclosure.

FIG. 15 shows a flowchart illustrating a method 1500 that supports sidelink based interference management in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a conditional grant that schedules a first resource for communications between the UE and the base station, the conditional grant including a first indication to use a sidelink resource to identify a likelihood of interference between different base stations communicating using the first resource. The operations of 1505 may be performed in accordance with examples as disclosed herein. In some examples, aspects of the operations of 1505 may be performed by a conditional grant receiver 925 as described with reference to FIG. 9.

At 1510, the method may include monitoring the sidelink resource for a second indication of interference associated with the first resource based on receiving the conditional grant. The operations of 1510 may be performed in accordance with examples as disclosed herein. In some examples, aspects of the operations of 1510 may be performed by a second indication monitoring component 930 as described with reference to FIG. 9.

At 1515, the method may include transmitting, to the base station using a second resource, a third indication of whether the interference associated with the first resource of the conditional grant satisfies one or more criteria based on monitoring the sidelink resource. The operations of 1515 may be performed in accordance with examples as disclosed herein. In some examples, aspects of the operations of 1515 may be performed by a third indication transmitter 935 as described with reference to FIG. 9.

Figure 16:
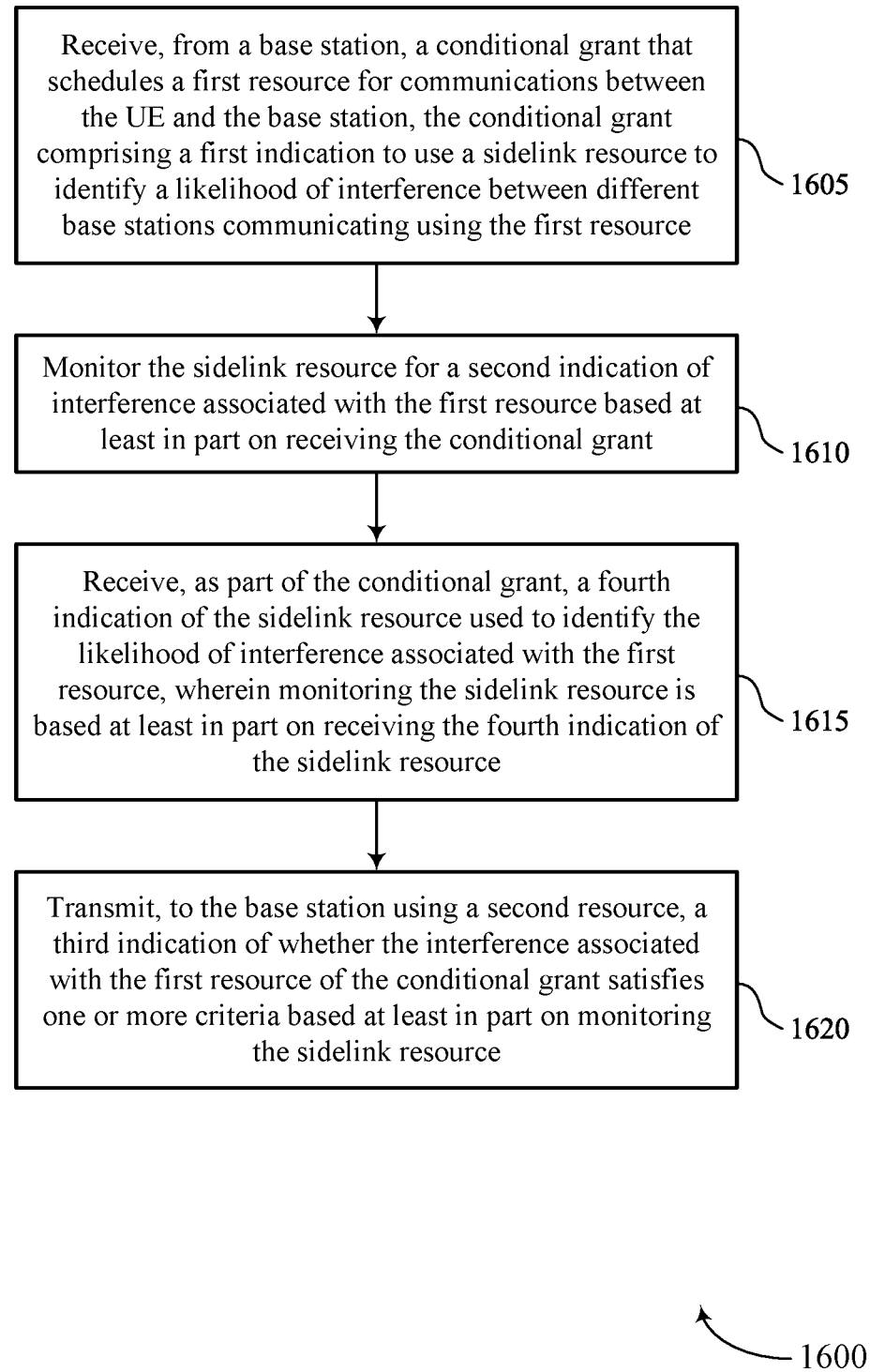

FIG. 16 shows a flowchart illustrating a method 1600 that supports sidelink based interference management in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a conditional grant that schedules a first resource for communications between the UE and the base station, the conditional grant including a first indication to use a sidelink resource to identify a likelihood of interference between different base stations communicating using the first resource. The operations of 1605 may be performed in accordance with examples as disclosed herein. In some examples, aspects of the operations of 1605 may be performed by a conditional grant receiver 925 as described with reference to FIG. 9.

At 1610, the method may include monitoring the sidelink resource for a second indication of interference associated with the first resource based on receiving the conditional grant. The operations of 1610 may be performed in accordance with examples as disclosed herein. In some examples, aspects of the operations of 1610 may be performed by a second indication monitoring component 930 as described with reference to FIG. 9.

At 1615, the method may include receiving, as part of the conditional grant, a fourth indication of the sidelink resource used to identify the likelihood of interference associated with the first resource, where monitoring the sidelink resource is based on receiving the fourth indication of the sidelink resource. The operations of 1615 may be performed in accordance with examples as disclosed herein. In some examples, aspects of the operations of 1615 may be performed by a fourth indication receiver 940 as described with reference to FIG. 9.

At 1620, the method may include transmitting, to the base station using a second resource, a third indication of whether the interference associated with the first resource of the conditional grant satisfies one or more criteria based on monitoring the sidelink resource. The operations of 1620 may be performed in accordance with examples as disclosed herein. In some examples, aspects of the operations of 1620 may be performed by a third indication transmitter 935 as described with reference to FIG. 9.

Figure 17:
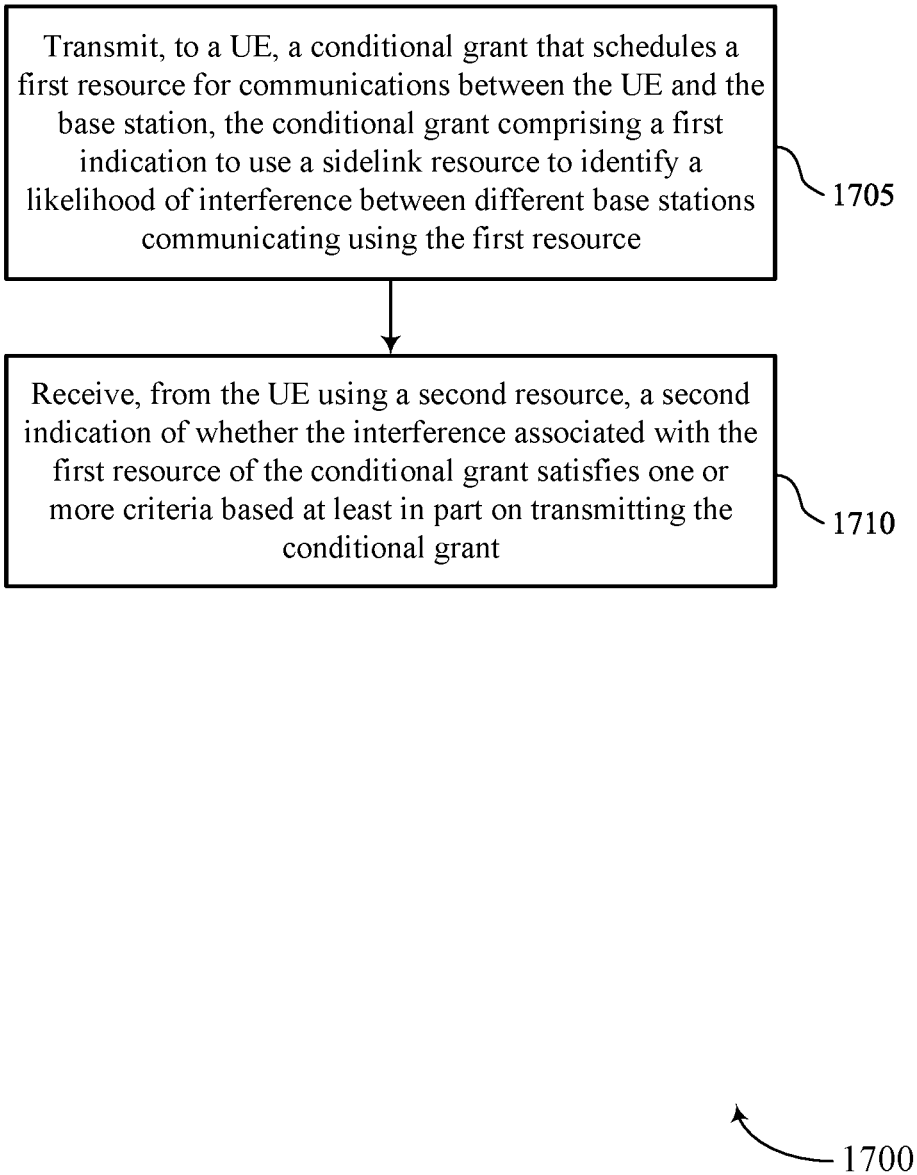

FIG. 17 shows a flowchart illustrating a method 1700 that supports sidelink based interference management in accordance with aspects of the present disclosure. The operations of the method 1700 may be implemented by a base station or its components as described herein. For example, the operations of the method 1700 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a conditional grant that schedules a first resource for communications between the UE and the base station, the conditional grant including a first indication to use a sidelink resource to identify a likelihood of interference between different base stations communicating using the first resource. The operations of 1705 may be performed in accordance with examples as disclosed herein. In some examples, aspects of the operations of 1705 may be performed by a conditional grant transmitter 1325 as described with reference to FIG. 13.

At 1710, the method may include receiving, from the UE using a second resource, a second indication of whether the interference associated with the first resource of the conditional grant satisfies one or more criteria based on transmitting the conditional grant. The operations of 1710 may be performed in accordance with examples as disclosed herein. In some examples, aspects of the operations of 1710 may be performed by a second indication receiver 1330 as described with reference to FIG. 13.

The following provides an overview of aspects of the present disclosure:

Aspect 1: A method for wireless communication at a UE, comprising: receiving, from a base station, a conditional grant that schedules a first resource for communications between the UE and the base station, the conditional grant comprising a first indication to use a sidelink resource to identify a likelihood of interference between different base stations communicating using the first resource; monitoring the sidelink resource for a second indication of interference associated with the first resource based at least in part on receiving the conditional grant; and transmitting, to the base station using a second resource, a third indication of whether the interference associated with the first resource of the conditional grant satisfies one or more criteria based at least in part on monitoring the sidelink resource.

Aspect 2: The method of aspect 1, further comprising: receiving, as part of the conditional grant, a fourth indication of the sidelink resource used to identify the likelihood of interference associated with the first resource, wherein monitoring the sidelink resource is based at least in part on receiving the fourth indication of the sidelink resource.

Aspect 3: The method of any of aspects 1 through 2, further comprising: identifying the sidelink resource based at least in part on a mapping between the first resource and one or more sidelink resources, wherein monitoring the sidelink resource is based at least in part on identifying the sidelink resource.

Aspect 4: The method of any of aspects 1 through 3, further comprising: transmitting, over the sidelink resource, a sidelink message to reserve the first resource for communication with the base station, wherein transmitting the third indication to the base station is based at least in part on transmitting the sidelink message.

Aspect 5: The method of aspect 4, wherein the sidelink message comprises a fourth indication of the first resource.

Aspect 6: The method of any of aspects 4 through 5, wherein the sidelink message is included in sidelink control information, a medium access control control element in broadcast physical sidelink shared channel, groupcast physical sidelink shared channel, or a combination thereof.

Aspect 7: The method of any of aspects 4 through 6, wherein the sidelink message comprises a flag that the first resource is reserved for uplink communications or downlink communications.

Aspect 8: The method of any of aspects 4 through 7, wherein the sidelink message includes a physical cell identifier of the base station or a compressed indicator of the base station.

Aspect 9: The method of any of aspects 4 through 8, wherein the sidelink message indicates a value of a threshold to compare with the interference associated with the first resource, the method further comprising: determining whether the interference satisfies the threshold, wherein transmitting the third indication is based at least in part on the determination.

Aspect 10: The method of any of aspects 4 through 9, wherein the sidelink message further indicates a difference between a transmit power associated with the first resource and a transmit power associated with the sidelink resource.

Aspect 11: The method of any of aspects 1 through 10, further comprising: receiving, as part of the conditional grant, a fourth indication of the second resource used to transmit the third indication, wherein transmitting the third indication to the base station over the second resource is based at least in part on receiving the fourth indication of the second resource.

Aspect 12: The method of any of aspects 1 through 11, wherein monitoring the sidelink resource further comprises: monitoring a signal strength received over the sidelink resource, wherein transmitting the third indication is based at least in part on monitoring the signal strength.

Aspect 13: The method of aspect 12, wherein monitoring the signal strength is part of a contention-based channel access protocol associated with the sidelink resource.

Aspect 14: The method of any of aspects 1 through 13, further comprising: communicating, with the base station, over the first resource based at least in part on the interference associated with the first resource of the conditional grant being below a threshold.

Aspect 15: The method of aspect 14, wherein the third indication comprises an acknowledgement that the UE is using the first resource for communications scheduled by the conditional grant.

Aspect 16: The method of any of aspects 1 through 15, further comprising: refraining from communicating with the base station over the first resource based at least in part on the interference associated with the first resource of the conditional grant being above a threshold.

Aspect 17: The method of aspect 16, wherein the third indication comprises a negative acknowledgement that the UE is failing to use the first resource for communications scheduled by the conditional grant.

Aspect 18: The method of any of aspects 16 through 17, wherein the first resource comprises a downlink communication between the base station and the UE, the method further comprising: determining that an uplink communication between a second base station and a second UE is scheduled to use the first resource, wherein refraining from communicating is based at least in part on the determination.

Aspect 19: The method of any of aspects 16 through 18, wherein the first resource comprises a downlink communication between the base station and the UE, the method further comprising: determining that the interference between the first resource used for communications between the base station and the UE is caused by an uplink communication between a second base station and a second UE, the second base station being associated with the base station, wherein refraining from communicating is based at least in part on the determination.

Aspect 20: The method of any of aspects 16 through 19, wherein the first resource comprises a downlink communication between the base station and the UE, the method further comprising: determining that the interference between the first resource used for communications between the base station and the UE is caused by an uplink communication between a second base station and a second UE and that the interference is above the threshold, wherein refraining from communicating is based at least in part on the determination.

Aspect 21: The method of any of aspects 16 through 20, wherein the likelihood of interference is determined based at least in part on a quantity of resource elements of the first resource experiencing the interference with a link between a second base station and a second UE, a set of sidelink demodulation reference signals satisfying one or more thresholds, or both.

Aspect 22: The method of any of aspects 16 through 21, wherein the first resource comprises a first downlink communication between the base station and the UE, the method further comprising: determining that a second downlink communication between a second base station and a second UE is scheduled to use the first resource, wherein refraining from communicating is based at least in part on the determination.

Aspect 23: The method of any of aspects 16 through 22, wherein the first resource comprises a first downlink communication between the base station and the UE, the method further comprising: determining that the interference between the first resource used for communications between the base station and the UE is caused by a second downlink communication between a second base station and a second UE, the second base station being associated with the base station, wherein refraining from communicating is based at least in part on the determination.

Aspect 24: The method of any of aspects 16 through 23, wherein the first resource comprises a first downlink communication between the base station and the UE, the method further comprising: determining that the interference between the first resource used for communications between the base station and the UE is caused by a second downlink communication between a second base station and a second UE; and determining that the interference comprises cross-link interference with an uplink communication, wherein refraining from communicating is based at least in part on the determinations.

Aspect 25: The method of any of aspects 16 through 24, wherein the first resource comprises an uplink communication between the base station and the UE, the method further comprising: determining that a downlink communication between a second base station and a second UE is scheduled to use the first resource, wherein refraining from communicating is based at least in part on the determination.

Aspect 26: The method of any of aspects 16 through 25, wherein the first resource comprises an uplink communication between the base station and the UE, the method further comprising: determining that the interference between the first resource used for communications between the base station and the UE is caused by a downlink communication between a second base station and a second UE and that the interference being above the threshold, wherein refraining from communicating is based at least in part on the determination.

Aspect 27: The method of any of aspects 16 through 26, wherein the first resource comprises a first uplink communication between the base station and the UE, the method further comprising: determining that a second uplink communication between a second base station and a second UE is scheduled to use the first resource, wherein refraining from communicating is based at least in part on the determination.

Aspect 28: The method of any of aspects 16 through 27, wherein the first resource comprises a first uplink communication between the base station and the UE, the method further comprising: determining that the interference between the first resource used for communications between the base station and the UE is caused by a second uplink communication between a second base station and a second UE, the second base station being associated with the base station, wherein refraining from communicating is based at least in part on the determination.

Aspect 29: The method of any of aspects 16 through 28, wherein the first resource comprises a first uplink communication between the base station and the UE, the method further comprising: determining that the interference between the first resource used for communications between the base station and the UE is caused by a second uplink communication between a second base station and a second UE; and determining that the interference comprises cross-link interference with an uplink communication, wherein refraining from communicating is based at least in part on the determinations.

Aspect 30: The method of any of aspects 1 through 29, wherein the interference comprises cross-link interference between base stations transmitting and receiving over a same frequency resource in a time division duplexing scheme, the cross-link interference corresponding to uplink-to-downlink interference.

Aspect 31: The method of any of aspects 1 through 30, wherein the conditional grant comprises a sidelink gated downlink and uplink grant.

Aspect 32: The method of any of aspects 1 through 31, wherein the third indication includes information identified in response to monitoring the sidelink resource and the third indication is transmitted as part of uplink control information.

Aspect 33: The method of any of aspects 1 through 32, wherein the third indication comprises a physical uplink shared channel transmission.

Aspect 34: A method for wireless communications at a base station, comprising: transmitting, to a UE, a conditional grant that schedules a first resource for communications between the UE and the base station, the conditional grant comprising a first indication to use a sidelink resource to identify a likelihood of interference between different base stations communicating using the first resource; receiving, from the UE using a second resource, a second indication of whether the interference associated with the first resource of the conditional grant satisfies one or more criteria based at least in part on transmitting the conditional grant.

Aspect 35: The method of aspect 34, further comprising: transmitting, as part of the conditional grant, a fourth indication of the sidelink resource used to identify the likelihood of interference associated with the first resource.

Aspect 36: The method of any of aspects 34 through 35, further comprising: communicating with a second base station to identify sidelink resources used to identify the likelihood of interference between different base stations; and identifying one or more sidelink resources for use by UEs associated with the base station to transmit sidelink messages, wherein transmitting the first indication is based at least in part on the identifying.

Aspect 37: The method of any of aspects 34 through 36, further comprising: transmitting, to the UE, a downlink message based at least in part on receiving the second indication, wherein the downlink message is scheduled by the conditional grant and comprises downlink control information.

Aspect 38: The method of any of aspects 34 through 37, further comprising: transmitting, as part of the conditional grant, a fourth indication of the second resource used to receive the second indication, wherein receiving the second indication from the UE over the second resource is based at least in part on transmitting the fourth indication of the second resource.

Aspect 39: The method of any of aspects 34 through 38, further comprising: communicating, with the UE, over the first resource based at least in part on the interference associated with the first resource of the conditional grant being below a threshold.

Aspect 40: The method of aspect 39, wherein the second indication comprises an acknowledgement that the UE is using the first resource for communications scheduled by the conditional grant.

Aspect 41: The method of any of aspects 34 through 40, further comprising: refraining from communicating with the UE over the first resource based at least in part on the interference associated with the first resource of the conditional grant being above a threshold.

Aspect 42: The method of any of aspects 34 through 41, wherein the second indication comprises a negative acknowledgement that the UE is failing to use the first resource for communications scheduled by the conditional grant.

Aspect 43: The method of any of aspects 34 through 42, wherein the interference comprises cross-link interference between base stations transmitting and receiving over a same frequency resource in a time division duplexing scheme, the cross-link interference corresponding to uplink-to-downlink interference.

Aspect 44: The method of any of aspects 34 through 43, wherein the conditional grant comprises a sidelink gated downlink and uplink grant.

Aspect 45: The method of any of aspects 34 through 44, wherein the second indication is received as part of uplink control information.

Aspect 46: The method of any of aspects 34 through 45, wherein the second indication comprises a physical uplink shared channel transmission.

Aspect 47: An apparatus for wireless communication at a UE, comprising a processor; memory coupled with the processor; and instructions stored in the memory and executable by the processor to cause the apparatus to perform a method of any of aspects 1 through 33.

Aspect 48: An apparatus for wireless communication at a UE, comprising at least one means for performing a method of any of aspects 1 through 33.

Aspect 49: A non-transitory computer-readable medium storing code for wireless communication at a UE, the code comprising instructions executable by a processor to perform a method of any of aspects 1 through 33.

Aspect 50: An apparatus for wireless communications at a base station, comprising a processor; memory coupled with the processor; and instructions stored in the memory and executable by the processor to cause the apparatus to perform a method of any of aspects 34 through 46.

Aspect 51: An apparatus for wireless communications at a base station, comprising at least one means for performing a method of any of aspects 34 through 46.

Aspect 52: A non-transitory computer-readable medium storing code for wireless communications at a base station, the code comprising instructions executable by a processor to perform a method of any of aspects 34 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, a conditional grant that schedules a first resource for communications between the UE and the base station, the conditional grant comprising a first indication to use a sidelink resource to identify a likelihood of interference between different base stations communicating using the first resource;
   monitoring the sidelink resource for a second indication of interference associated with the first resource based at least in part on receiving the conditional grant; and
   transmitting, to the base station using a second resource, a third indication of whether the interference associated with the first resource of the conditional grant satisfies one or more criteria based at least in part on monitoring the sidelink resource.

2. The method of claim 1, further comprising:
   receiving, as part of the conditional grant, a fourth indication of the sidelink resource used to identify the likelihood of interference associated with the first resource, wherein monitoring the sidelink resource is based at least in part on receiving the fourth indication of the sidelink resource.

3. The method of claim 1, further comprising:
   identifying the sidelink resource based at least in part on a mapping between the first resource and one or more sidelink resources, wherein monitoring the sidelink resource is based at least in part on identifying the sidelink resource.

4. The method of claim 1, further comprising:
   transmitting, over the sidelink resource, a sidelink message to reserve the first resource for communication with the base station, wherein transmitting the third indication to the base station is based at least in part on transmitting the sidelink message.

5. The method of claim 4, wherein the sidelink message comprises a fourth indication of the first resource.

6. The method of claim 4, wherein the sidelink message is included in sidelink control information, a medium access control element in broadcast physical sidelink shared channel, groupcast physical sidelink shared channel, or a combination thereof.

7. The method of claim 4, wherein the sidelink message comprises a flag that the first resource is reserved for uplink communications or downlink communications.

8. The method of claim 4, wherein the sidelink message includes a physical cell identifier of the base station or a compressed indicator of the base station.

9. The method of claim 4, wherein the sidelink message indicates a value of a threshold to compare with the interference associated with the first resource, the method further comprising:
   determining whether the interference satisfies the threshold, wherein transmitting the third indication is based at least in part on the determination.

10. The method of claim 4, wherein the sidelink message further indicates a difference between a transmit power associated with the first resource and a transmit power associated with the sidelink resource.

11. The method of claim 1, further comprising:
   receiving, as part of the conditional grant, a fourth indication of the second resource used to transmit the third indication, wherein transmitting the third indication to the base station over the second resource is based at least in part on receiving the fourth indication of the second resource.

12. The method of claim 1, wherein monitoring the sidelink resource further comprises:
   monitoring a signal strength received over the sidelink resource, wherein transmitting the third indication is based at least in part on monitoring the signal strength, wherein monitoring the signal strength is part of a contention-based channel access protocol associated with the sidelink resource.

13. The method of claim 1, further comprising:
   communicating, with the base station, over the first resource based at least in part on the interference associated with the first resource of the conditional grant being below a threshold, wherein the third indication comprises an acknowledgement that the UE is using the first resource for communications scheduled by the conditional grant.

14. The method of claim 1, further comprising:
   refraining from communicating with the base station over the first resource based at least in part on the interference associated with the first resource of the conditional grant being above a threshold, wherein the third indication comprises a negative acknowledgement that the UE is failing to use the first resource for communications scheduled by the conditional grant.

15. The method of claim 14, wherein the first resource comprises a downlink communication between the base station and the UE, the method further comprising:
   determining that an uplink communication between a second base station and a second UE is scheduled to use the first resource, wherein refraining from communicating is based at least in part on the determination and the first resource comprising the downlink communication between the base station and the UE.

16. The method of claim 14, wherein the first resource comprises a downlink communication between the base station and the UE, the method further comprising:
   determining that the interference between the first resource used for communications between the base station and the UE is caused by an uplink communication between a second base station and a second UE and that the interference is above the threshold, wherein refraining from communicating is based at least in part on the determination.

17. The method of claim 14, wherein the likelihood of interference is determined based at least in part on a quantity of resource elements of the first resource experiencing the interference with a link between a second base station and a second UE, a set of sidelink demodulation reference signals satisfying one or more thresholds, or both.

18. The method of claim 14, wherein the first resource comprises a first downlink communication between the base station and the UE, the method further comprising:
   determining that a second downlink communication between a second base station and a second UE is scheduled to use the first resource, wherein refraining from communicating is based at least in part on the determination.

19. The method of claim 14, wherein the first resource comprises a first downlink communication between the base station and the UE, the method further comprising:
   determining that the interference between the first resource used for communications between the base station and the UE is caused by a second downlink communication between a second base station and a second UE, the second base station being associated with the base station, wherein refraining from communicating is based at least in part on the determination.

20. The method of claim 14, wherein the first resource comprises a first downlink communication between the base station and the UE, the method further comprising:
determining that the interference between the first resource used for communications between the base station and the UE is caused by a second downlink communication between a second base station and a second UE; and
determining that the interference comprises cross-link interference with an uplink communication, wherein refraining from communicating is based at least in part on the determinations.

21. The method of claim 14, wherein the first resource comprises an uplink communication between the base station and the UE, the method further comprising:
determining that a downlink communication between a second base station and a second UE is scheduled to use the first resource, wherein refraining from communicating is based at least in part on the determination.

22. The method of claim 14, wherein the first resource comprises an uplink communication between the base station and the UE, the method further comprising:
determining that the interference between the first resource used for communications between the base station and the UE is caused by a downlink communication between a second base station and a second UE and that the interference being above the threshold, wherein refraining from communicating is based at least in part on the determination.

23. The method of claim 14, wherein the first resource comprises a first uplink communication between the base station and the UE, the method further comprising:
determining that a second uplink communication between a second base station and a second UE is scheduled to use the first resource, wherein refraining from communicating is based at least in part on the determination.

24. The method of claim 14, wherein the first resource comprises a first uplink communication between the base station and the UE, the method further comprising:
determining that the interference between the first resource used for communications between the base station and the UE is caused by a second uplink communication between a second base station and a second UE, the second base station being associated with the base station, wherein refraining from communicating is based at least in part on the determination.

25. The method of claim 14, wherein the first resource comprises a first uplink communication between the base station and the UE, the method further comprising:
determining that the interference between the first resource used for communications between the base station and the UE is caused by a second uplink communication between a second base station and a second UE; and
determining that the interference comprises cross-link interference with an uplink communication, wherein refraining from communicating is based at least in part on the determinations.

26. The method of claim 1, wherein the interference comprises cross-link interference between base stations transmitting and receiving over a same frequency resource in a time division duplexing scheme, the cross-link interference corresponding to uplink-to-downlink interference.

27. The method of claim 1, wherein the conditional grant comprises a sidelink gated downlink and uplink grant and wherein the third indication includes information identified in response to monitoring the sidelink resource.

28. A method for wireless communications at a base station, comprising:
transmitting, to a user equipment (UE), a conditional grant that schedules a first resource for communications between the UE and the base station, the conditional grant comprising a first indication to use a sidelink resource to identify a likelihood of interference between different base stations communicating using the first resource; and
receiving, from the UE using a second resource, a second indication of whether the interference associated with the first resource of the conditional grant satisfies one or more criteria based at least in part on transmitting the conditional grant.

29. An apparatus for wireless communication at a user equipment (UE), comprising:
a processor;
memory coupled with the processor; and
instructions stored in the memory and executable by the processor to cause the apparatus to:
receive, from a base station, a conditional grant that schedules a first resource for communications between the UE and the base station, the conditional grant comprising a first indication to use a sidelink resource to identify a likelihood of interference between different base stations communicating using the first resource;
monitor the sidelink resource for a second indication of interference associated with the first resource based at least in part on receiving the conditional grant; and
transmit, to the base station using a second resource, a third indication of whether the interference associated with the first resource of the conditional grant satisfies one or more criteria based at least in part on monitoring the sidelink resource.

30. An apparatus for wireless communications at a base station, comprising:
a processor;
memory coupled with the processor; and
instructions stored in the memory and executable by the processor to cause the apparatus to:
transmit, to a user equipment (UE), a conditional grant that schedules a first resource for communications between the UE and the base station, the conditional grant comprising a first indication to use a sidelink resource to identify a likelihood of interference between different base stations communicating using the first resource; and
receive, from the UE using a second resource, a second indication of whether the interference associated with the first resource of the conditional grant satisfies one or more criteria based at least in part on transmitting the conditional grant.

* * * * *